United States Patent [19]
Nakamoto et al.

[11] Patent Number: 5,936,810
[45] Date of Patent: Aug. 10, 1999

[54] MAGNETORESISTIVE EFFECT HEAD

[75] Inventors: Kazuhiro Nakamoto; Yoshiaki Kawato, both of Hitachi, Japan

[73] Assignee: Hitachi, Ltd., Tokyo, Japan

[21] Appl. No.: 08/795,646

[22] Filed: Feb. 6, 1997

[30] Foreign Application Priority Data

Feb. 14, 1996 [JP] Japan .................................. 8-026552

[51] Int. Cl.$^6$ ...................................................... G11B 5/39
[52] U.S. Cl. ............................................................ 360/113
[58] Field of Search ............................ 360/113; 324/252; 338/32 R

[56] References Cited

U.S. PATENT DOCUMENTS 5,438,470  8/1995  Ravipati et al. .
5,608,593  3/1997  Kim et al. ............................... 360/113

Primary Examiner—Robert S. Tupper
Attorney, Agent, or Firm—Antonelli, Terry, Stout & Kraus, LLP

[57] ABSTRACT

A magnetoresistive effect head which can produce a high reproduced output independently from a strength of a magnetic domain control layer even when an electrode spacing is small, and a magnetic recording and reproducing apparatus using the same are provided. A magnetoresistive effect film is formed by a stacked layer of a first ferromagnetic film, a non-magnetic conductive film and a second ferromagnetic film. The second ferromagnetic film is stacked on an antiferromagnetic film, and magnetic domain control layers are arranged on the widthwise opposite sides of the magnetoresistive effect film. A pair of electrodes are arranged on each magnetic domain control layers with the electrode spacing being smaller than the width of the magnetoresistive effect film so that a current flows only in a central area of the magnetoresistive effect film.

20 Claims, 13 Drawing Sheets

MAGNETIC DISK APPARATUS

MAGNETORESISTIVE EFFECT HEAD

BACKGROUND OF THE INVENTION

The present invention relates to a novel magnetoresistive effect head and a magnetic recording and reproducing apparatus using the same, and more particularly to a magnetoresistive effect head suitable for a recording head for reproducing information of a magnetic recording medium by utilizing a giant magnetoresistive effect and a magnetic recording and reproducing apparatus using the same.

A reproducing head as well as a recording head are mounted on a magnetic recording and reproducing apparatus, and an AMR (Anisotropic Magnetoresistive) head which utilizes an anisotropic magnetoresistive effect has been proposed as a reproducing head. In the AMR head, since it is required to suppress a Barkhausen noise generated by the head to prevent a malfunction of the magnetic recording and reproducing apparatus, a magnetic domain control layer for maintaining the magnetoresistive effect layer in a single magnetic domain state is provided in the head.

In a first generation AMR head having the magnetic domain control layer provided therein, a magnetic domain control system called a patterned exchange as disclosed in U.S. Pat. No. 4,663,685 is adopted. In this system, a magnetic domain control layer formed of an antiferromagnetic film is patterned, the patterned magnetic domain control layer is stacked only in end regions of a magnetoresistive effect film (MR film), this region is maintained in a single magnetic domain state, and a central magnetic sensing area (a region sandwitched between a pair of electrodes for transducing a change in a magnetic field to an electrical signal) of the MR films is induced to a single magnetic domain state.

It has been reported that the AMR head adopting the patterned exchange system can improve a sensitivity by increasing a spacing of the magnetic domain control layers to be larger than a spacing of electrodes, as disclosed in an article of the Institute Journal of the Magnetics Society of Japan, Vol. 19, page 105 (1995).

In a second generation AMR head, a hard biasing system is adopted as disclosed in JP-A-3-125311 in order to facilitate the manufacture as compared with the first generation AMR head. In this system, both ends of the MR film extended to the end regions are cut off, the MR film is formed only in the magnetic sensing area, and the magnetic sensing area is maintained in a single magnetic domain state by a magnetic field generated by a permanent magnet. It has also been proposed to use a lamination of ferromagnetic films and antiferromagnetic films instead of the permanent magnet as disclosed in JP-A-7-57223.

On the other hand, as a next generation high sensitivity MR head which takes place of the AMR head, a spin valve head utilizing a giant magnetoresistive effect has been proposed as disclosed in JP-A-4-358310. The spin valve head comprises, as a magnetoresistive effect film, a first ferromagnetic film whose direction of magnetization is change by a magnetic field from a magnetic recording medium, a second ferromagnetic film whose direction of magnetization is fixed and a nonmagnetic conductive film inserted between the first and second ferromagnetic films. The second ferromagnetic film is stacked on an antiferromagnetic film or a permanent magnet which serves to fix the direction of magnetization of the second ferromagnetic film. In order to enhance an output of the spin valve head, a dual type of spin valve head has been proposed as an application of the spin valve head as disclosed in JP-A-5-347013. The dual spin valve head comprises, as a magnetoresistive effect film, a first ferromagnetic film whose direction of magnetization is changed by a magnetic field from a magnetic recording medium, second and third ferromagnetic films whose directions of magnetization are fixed, a nonmagnetic conductive film inserted between the first ferromagnetic film and the second ferromagnetic film and a non-magnetic conductive film inserted between the first ferromagnetic film and the third ferromagnetic film. The second ferromagnetic film and the third ferromagnetic film are stacked above and below the first ferromagnetic film to oppose to the first ferromagnetic film, and the second and third ferromagnetic films are directly stacked on an antiferromagnetic films or permanent magnet which serves to fix the directions of magnetization of the second and third ferromagnetic films.

In those spin valve heads, since the direction of magnetization is changed by the magnetic field from the magnetic recording head in the first ferromagnetic film, it is required to maintain the first ferromagnetic film in the single magnetic domain state.

The spin valve head has been known as one which takes place of the AMR head, but in the prior art spin valve head which uses the hard biasing system, a reproduced waveform may be distorted or a reproduced output may be dropped by a strength of the magnetic domain control layer.

For example, when a strength of the magnetic domain control layer is not enough to bring the first ferromagnetic film to the single magnetic domain state, the reproduced waveform may be distorted and the magnetic recording and reproducing apparatus may malfunction. This distortion is usually called a Barkhausen noise and it has been proved that a cause of the generation of this noise is discontinuous movement of magnetization at the ends of the first ferromagnetic film. This Barkhausen noise is easier to be generated in the spin valve head than in the AMR head. This is because, in the spin valve head, the operation is mainly conducted while the magnetization of the first ferromagnetic film is oriented laterally and in the AMR head, the operation is mainly conducted while the magnetization of the MR film is inclined to approximately 45 degrees. Namely, in the spin valve head, when leakage magnetic fields (positive and negative) of the magnetic recording medium are applied, the magnetization at the ends of the first ferromagnetic film are vertically inverted. This is because a static energy is high when the magnetization at the ends of the first ferromagnetic film is directed laterally while the strength of the magnetic domain control layer is not sufficient so that the oblique upward or oblique downward direction of magnetization is in an instable state. On the other hand, in the AMR head, since the magnetization at the ends of the first ferromagnetic film is always oriented obliquely, the discontinuous movement of the magnetization as observed in the spin valve head does not take place.

When the strength of magnetization is sufficient to a certain extent and the spacing of the electrodes of the spin valve head is reduced to increase a track density of the magnetic recording and reproducing apparatus, an output (sensitivity) per unit electrode spacing abruptly decreases. The output of the spin valve head increases basically in proportion to the electrode spacing. This is because the longer the areas in which the voltage changes are serially connected, the larger is the overall change in the voltage. However, when the electrode spacing is simply reduced in the prior art hard bias system spin valve head, the output (sensitivity) per unit electrode spacing abruptly decreases. Particularly when the electrode spacing is reduced to 2 $\mu$m or less, the sensitivity of the head is reduced to 90% or less of its inherent sensitivity. A cause for the reduction of the sensitivity is the low sensitivity at the left and right end regions of the first ferromagnetic film by the influence of the magnetic domain control layer stacked below the electrode. Accordingly, as the electrode spacing is reduced and the influence by the magnetic domain control layer increases, a proportion of the high sensitivity central area is reduced, and as a result, the sensitivity is reduced. Accordingly, in the prior art hard biasing system spin valve head, when the electrode spacing is simply reduced, the sensitivity is abruptly reduced and the malfunction of the magnetic recording and reproducing apparatus increases. As a result, it is difficult to increase the track density of the magnetic recording and reproducing apparatus.

Further, when the strength of the magnetic domain control layer is sufficient to a certain extent, the head output is abruptly reduced as the strength of the magnetic domain control layer increase even if the electrode spacing is kept unchanged. For example, when a longitudinal bias ratio which is a factor to indicate the strength of the magnetic domain control layer is 2, the head output is reduced to approximately 60% of its inherent output. When the magnetic domain control layer is the permanent magnet, the longitudinal bias ratio is represented by a ratio of a product (Br·t) of a remanent magnetic flux density Br of the permanent magnet and a film thickness t, and a product (Bs·t) of a saturation magnetic flux density Bs of the first ferromagnetic film in the spin valve head and the film thickness t. When the magnetic domain control layer is the stacked layer of the ferromagnetic films and the antiferromagnetic films, the longitudinal bias ratio is represented by a ratio of a product (Bs·t) of the saturation magnetic flux density Bs of the ferromagnetic film in the magnetic domain control layer and the film thickness t, and a product (Bs·t) of a saturation magnetic flux density Bs of the first ferromagnetic film in the spin valve head and the film thickness t.

Further, since the magnetic domain control layer is manufactured in a separate process from that of the first ferromagnetic film, the strength of the magnetic domain control layer, that is, the longitudinal bias ration includes a variation to some extent. As a result, the head output includes a variation. Further, as described above, since the Barkhausen noise is generated if the strength of the magnetic domain control layer is insufficient, the strength of the magnetic domain control layer is set to be somewhat larger than a required value. As a result, the output is reduced.

In the prior art hard bias system spin valve head, since the head output largely depends on the strength of the magnetic domain control layer, the output is reduced and the malfunction of the magnetic recording and reproducing apparatus increases when the strength of the magnetic domain control layer is high.

SUMMARY OF THE INVENTION

It is an object of the present invention to provide a magnetoresistive effect head which can produce a high reproduced output independently from the strength of the magnetic domain control layer even if the electrode spacing is small, and a magnetic recording and reproducing apparatus using such a head.

In order to achieve the above object, according to the present invention, there is provided a magnetoresistive effect head comprising a magnetoresistive effect film having a plurality of stacked films of a dimension corresponding to a track width of a magnetic recording medium, magnetic domain control layers arranged on the opposite sides of said magnetoresistive effect film intersecting a stack direction of the magnetoresistive effect film, and a pair of electrodes stacked on said magnetic domain control layer and electrically connected to said magnetoresistive effect film. The magnetoresistive effect film comprises a first ferromagnetic film of single layer or multi-layer having a direction of magnetization thereof changed by a magnetic field from a magnetic recording medium, a second ferromagnetic film of single layer or multi-layer having a direction of magnetization thereof fixed and a nonmagnetic conductive film inserted between the first ferromagnetic film and the second ferromagnetic film, and the second ferromagnetic film is stacked directly of an antiferromagnetic film or permanent magnet film for fixing the direction of magnetization of the second ferromagnetic film. Portions of the pair of electrodes are stacked on the magnetoresistive effect film and a spacing of said electrodes being narrower than a width of said magnetoresistive effect film or the electrodes are arranged at positions which cause the flow of current only at a central area of the magnetoresistive effect film and the electrode spacing is not larger than 2 $\mu$m. The spacing may be 0.25~1.5 $\mu$m.

In the magnetoresistive effect head utilizing the giant magnetoresistive effect, when the antiferromagnetic film or the permanent magnet for fixing the direction of magnetization is directly stacked on the second ferromagnetic film, a portion of a pair of electrodes may be stacked on the antiferromagnetic film or the permanent magnet and the electrode spacing may be smaller than a width of the magnetoresistive effect film.

Further, according to the present invention, there is provided a magnetoresistive effect head comprising a magnetoresistive effect film having a plurality of stacked films of dimension corresponding to a track width of a magnetic recording medium, magnetic domain control layers arranged on the opposite sides of the magnetoresistive effect film and a pair of electrodes stacked on the magnetic domain control layer and electrically connected to the magnetoresistive effect film. The magnetoresistive effect film comprises a first ferromagnetic film of single layer or multi-layer having a direction of magnetization thereof changed by a magnetic field from the magnetic recording medium, second and third ferromagnetic films of single layers or multi-layers having a direction of magnetization thereof fixed, a first non-magnetic conductive film inserted between the first ferromagnetic film and the second ferromagnetic film and a second non-magnetic conductive film inserted between the second ferromagnetic film and the third ferromagnetic film. The first ferromagnetic film is sacked on the second ferromagnetic film and the third ferromagnetic film is stacked on the first ferromagnetic film. Antiferromagnetic films or permanent magnet films for fixing the directions of magnetization of the second and third ferromagnetic films are provided.

In the magnetoresistive effect head utilizing the giant magnetoresistive effect, when the antiferromagnetic film or the permanent magnet for fixing the direction of magnetization is directly stacked on the third ferromagnetic film, a portion of the pair of electrode may be stacked on the antiferromagnetic film or the permanent magnet and the electrode spacing may be smaller than the width of the magnetoresistive effect film, or the electrodes may be arranged at current supplying positions only in the central area of the ferromagnetic effect film with the electrode spacing being 2 $\mu$m or less.

In the magnetoresistive effect head of the present invention, when the permanent magnet film is used as the magnetic domain control layer, the magnetic film for fixing the direction of magnetization of the second or third ferromagnetic film is preferably the antiferromagnetic film, and when the stacked layer of the antiferromagnetic film and the soft magnetic film is used as the magnetic domain control layer, the magnetic film for fixing the direction of magnetization of the second or third ferromagnetic film is preferably the antiferromagnetic film or the permanent magnet. The former case is more preferable.

The width of the ferromagnetic effect film is preferably the spacing of the pair of electrodes plus 0.5~4 μm.

The position of the electrode end which defines the electrode spacing of the pair of electrodes is preferably in a range of 0.25~2 μm from the widthwise ends of the magnetoresistive effect film.

Further, the electrode spacing of the pair of electrodes may be set to 2 μm or less, preferably 0.25~1.5 μm.

The magnetoresistive effect head of the present invention may be used as a reproducing head and applied to the following apparatus.

(1) A magnetic recording and reproducing apparatus comprising a magnetic recording medium for magnetically recording information, a reproducing head for transducing a change in a magnetic field leaked from the magnetic recording medium to an electrical signal and a reproduction circuit for processing the electrical signal from the reproducing head.

(2) A magnetic reproducing apparatus comprising a magnetic recording medium for magnetically recording information, a recording head for generating a magnetic field corresponding to an electrical signal and recording information represented by the magnetic field on a magnetic recording medium, a reproducing head for transducing a change in a magnetic field leaked from the magnetic recording medium to an electrical signal and a reproduction circuit for processing the electrical signal from the reproducing head.

(3) A disk array system comprising a plurality of above magnetic recording and reproducing apparatus and a controller for controlling the apparatus.

In accordance with the meas described above, the opposite ends of each electrode are arranged inner than the widthwise end positions of the magnetoresistive effect film, no substantial current flows to the widthwise ends of the magnetoresistive effect film and a current flows only in the central area which is hard to be influenced by the magnetic field from the magnetic domain control layer. Accordingly, even if the strength of the magnetic domain control layer is not sufficiently high, the generation of the Barkhausen noise from the magnetoresistive effect film is suppressed. Further, even if the strength of the magnetic domain control film layer is high, a high output may be maintained. Further, even if the electrode width is reduced, a high sensitivity output is maintained with the small read spread so that a high track density is attained.

In accordance with the present invention, since the electrode spacing is smaller than the width of the magnetoresistive effect film and the current is flown only in the central area of the magnetoresistive effect film, the generation of the Barkhausen noise is suppressed even if the strength of the magnetic domain control layer is not sufficiently high, and even if the strength of the magnetic domain control layer is sufficiently high, the variation in the output may be suppressed low. Further, even if the electrode spacing is small, a high sensitivity is attained with the small read spread, and the high track density is attained.

When the head of the present invention is used in the magnetic reproducing apparatus or the magnetic recording and reproducing apparatus, the malfunction may be reduced.

DETAILED DESCRIPTION OF THE PREFERRED EMBODIMENTS

[Embodiment 1]

Figure 1:
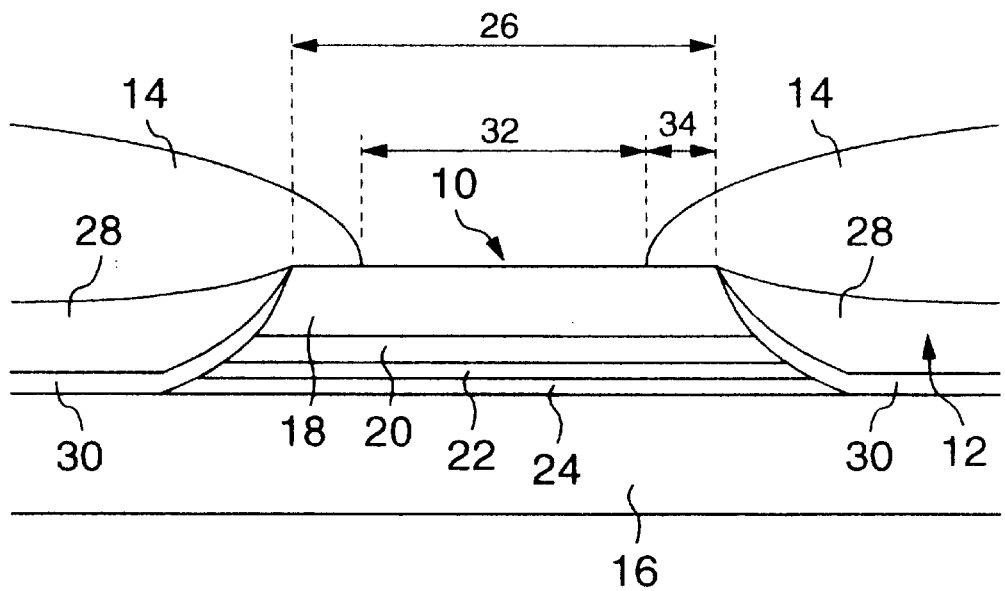
FIG. 1 to FIG. 3 show constructions of a spin valve head in accordance with an Embodiment 1 of the present invention.

FIG. 1 shows a configuration of a plane facing to a medium of a spin valve head of the present invention. In FIG. 1, the spin valve head (giant magnetoresistive effect head) constructed as a reproducing magnetoresistive effect head comprises a magnetoresistive effect film 10, a pair of magnetic domain control layers 12 and a pair of electrodes 14, and the magnetoresistive effect film 10 is stacked on an antiferromagnetic film 16. The magnetoresistive effect film 10 is formed of a multi-layer of a plurality of films having a dimension corresponding to a track width of a magnetic recording medium. The multi-layer film comprises a first ferromagnetic film 18, a non-magnetic conductive film 20 and second ferromagnetic, films 22 and 24, and the second ferromagnetic film 24 is stacked on the antiferromagnetic film 16. The multi-layer films are cut out to a dimension corresponding to a predetermined width (a width 26 of the magnetoresistive effect film) and stacked. The first ferromagnetic film 18 is formed of NiFe, CoFe, CoNiFe, or the like as a free layer which has a film thickness of 5 nm, preferably 2~15 nm. The non-magnetic conductive film 20 is formed of Cu and has a film thickness of 2 nm, preferably 1~5 nm. The second ferromagnetic films 22 and 24 form stacked films as fixed layers, and the second ferromagnetic film 22 is formed of Co and has a film thickness of 1 nm. The second ferromagnetic film 24 is formed of NiFe and has a film thickness of 1 nm, preferably 1–5 nm. The antiferromagnetic film 16 is formed of NiO and has a film thickness of 50 nm, preferably 20~80 nm. The second ferromagnetic films 22 and 24 have the directions of magnetization thereof fixed to be oriented toward the plane facing to the medium by exchange coupling with the antiferromagnetic film 16. The direction of magnetization of the first ferromagnetic film 18 is set to width direction of the magnetoresistive effect film and the direction of magnetization is changed normally to the plane of the drawing by a magnetic field of the magnetic recording medium. The first ferromagnetic film 18 is thicker than the total thickness of the second ferromagnetic films 22 and 24 and it is approximately two to three times as large as the total thickness.

The magnetic domain control layer 12 is formed of a stacked film of permanent magnet film 28 and an orientation control underlying film 30, and the magnetic domain control layers 12 are arranged adjacent to both sides of a widthwise area which intersects to the stacking direction of the magnetoresistive effect film 10. The permanent magnet 28 may be formed of CoCrPt alloy and the orientation control underlying film 30 may be formed of Cr having a film thickness of 10 nm, for example (preferably 0.5~20 nm). The first magnetoresistive film 18 is controlled by the magnetic field generated by the magnetic domain control layer 12. The magnetic domain control layer 12 of which height is the same as a height of the first ferromagnetic film 18 has a film thickness of 10 nm, for example (preferably 4~30 nm).

The pair of electrodes 14 are stacked on the magnetic domain control layer 12 and a portion of each electrode 14 is stacked on the first ferromagnetic film 18. Namely, each electrode 14 is stacked on the first ferromagnetic film 18 and the magnetic domain control layer 12 with an electrode spacing 32. Each electrode 14 may be formed of a metal such as Au, Cu or Ta, and the electrode spacing 32 of the electrodes 14 is smaller than the width 26 of the magnetoresistive effect film.

In the spin valve head, the output is proportional to a product of a specific resistivity change $\Delta\rho$ inherent to the spin valve film and $\cos \Delta\theta$ of the angle $\Delta\theta$ made by the directions of magnetization of the first ferromagnetic film and the second ferromagnetic film. Since the specific resistivity $\Delta\rho$ is more than two times as high as that of the AMR head, the spin valve head is known to be of high sensitivity as compared to the AMR head. Assuming that the direction of magnetization of the second ferromagnetic film is fixed normally to the plane facing to the medium, for example, directly below (−90°), $\cos \Delta\theta$ may be rewritten to $\cos (\theta+90°)$ by using the angle $\theta$ made by the direction of magnetization of the first ferromagnetic film and the plane facing to the medium. Namely, the output is proportional to $\sin \theta$. In order to change the output proportional to (relative to) the change in $\theta$, $\theta$ is preferably approximately 0°. Accordingly, the direction of magnetization of the first ferromagnetic film is set to be substantially parallel to the plane facing to the medium, that is, substantially lateral.

Figure 2:
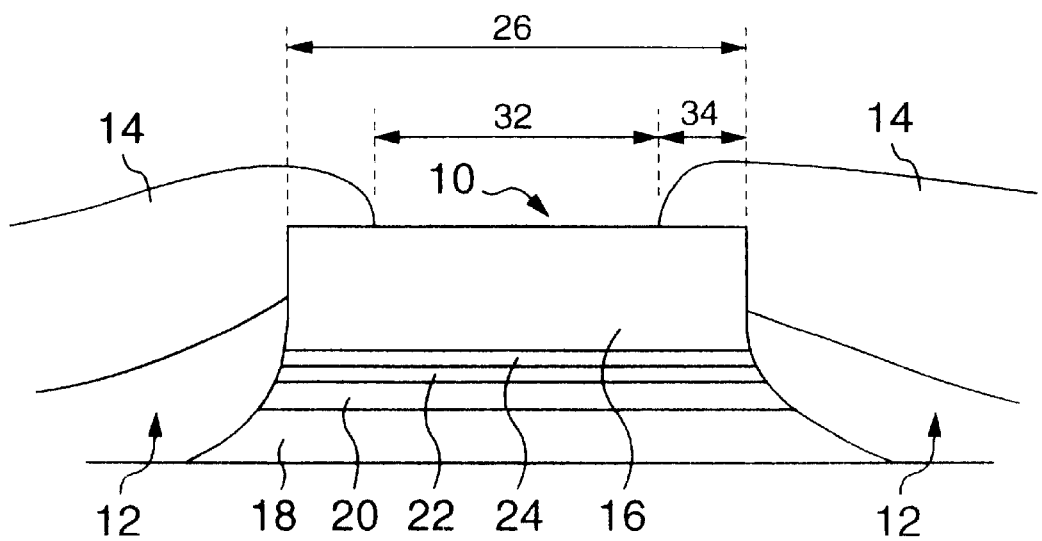

FIG. 2 shows a construction of the spin valve head in which alloy such as FeMn, NiMn, CrMn, or the like is used instead of NiO for the antiferromagnetic film 16. One of the second ferromagnetic films 22 and 24 can be omitted. As shown in FIG. 2, the stack direction of the magnetoresistive effect film 10 is different from that shown in FIG. 1, and the antiferromagnetic film 16 is stacked on the magnetoresistive effect film 10. In both FIG. 1 and FIG. 2, the antiferromagnetic film 16 may be substituted by the permanent magnet film. The thicknesses of the respective layers in FIG. 2 are same as those in FIG. 1. The magnetic domain control layer 12 is below the upper plane of the antiferromagnetic film 16.

Figure 3:
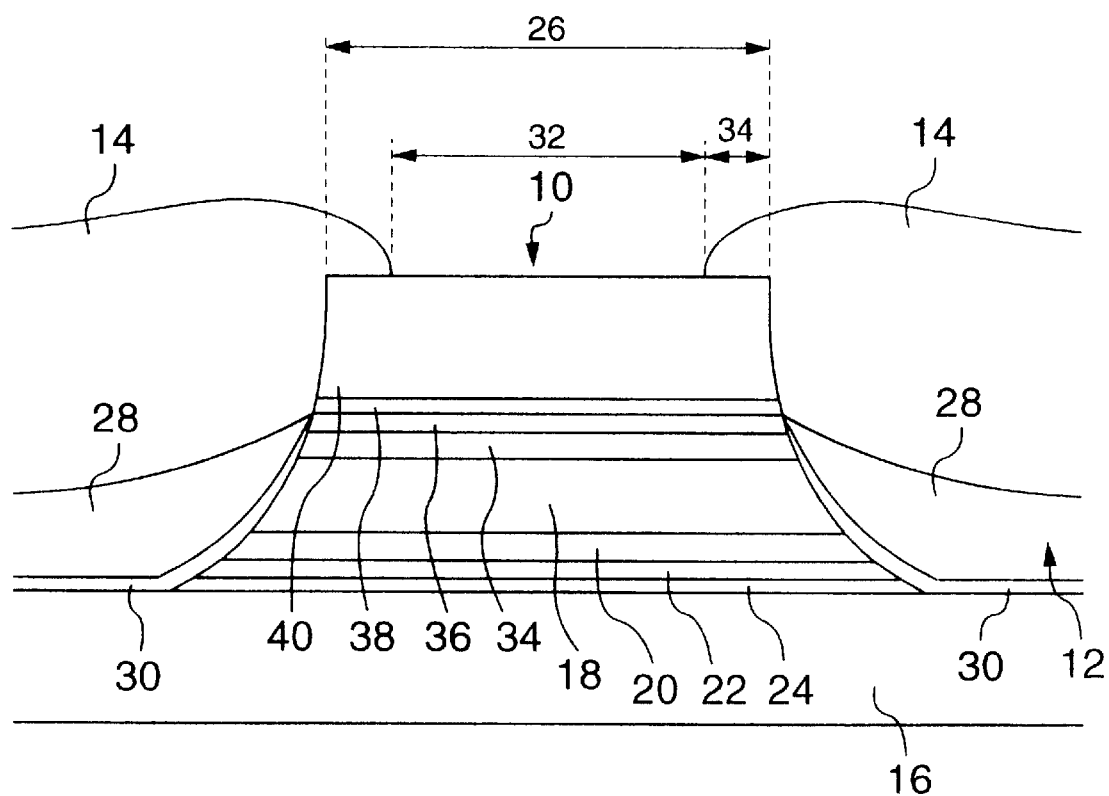

FIG. 3 show a construction of a dual spin valve head which is an application of the spin valve head to enhance the output. As shown in FIG. 3, the magnetoresistive effect film 10 comprises a first ferromagnetic film 18, second ferromagnetic films 22 and 24, third ferromagnetic films 36 and 38, a non-magnetic conductive layer 20 inserted between the first ferromagnetic film 18 and the second ferromagnetic film 22, and a non-magnetic conductive film 34 inserted between the first ferromagnetic film 18 and the third ferromagnetic film 36. The second ferromagnetic films 22 and 24 are stacked on an antiferromagnetic film 16, and an antiferromagnetic film 40 is stacked on the third ferromagnetic films 36 and 38. Both of the magnetization direction of the second and third ferromagnetic films are fixed. The first ferromagnetic film 18 is formed of NiFe, CoFe, CoNiFe, or the like as a free layer and has a film thickness of 5 nm. The non-magnetic conductive films 20 and 34 may be formed of Cu and have a film thickness of 2 nm. The second ferromagnetic films 22 and 24 and the third ferromagnetic films 36 and 38 form stacked layers as fixed layers, and the second ferromagnetic film 22 and the third ferromagnetic film 36 are formed by Co and have a film thickness of 1 nm. The second ferromagnetic film 24 and the third ferromagnetic film 38 may be formed of NiFe and have a film thickness of 1 nm, preferably 0.5~3 nm. The antiferromagnetic films 16 and 40 is formed of most appropriate one selected from alloys of FeMn, NiMn and CrMn or from Oxides of NiO and CoO. The antiferromagnetic films 16 and 40 may be formed of the same material or different materials. They may be substituted by the permanent magnets. Further, one of the second ferromagnetic films 22 and 24 may be omitted. Similarly, one of the third ferromagnetic films 36 and 38 may be omitted. The thicknesses of other layers are same as those in FIG. 1.

In each of the above spin valve heads, the permanent magnet 28 may be substituted by a stacked layer of an alloy of NiFe and an alloy of FeMn, NiMn or CrMr which is an antiferromagnetic film. In this case, the orientation control underlying layer 30 may be substituted by Ta to attain a better characteristic. The magnetic domain control film 12 is formed below the upper plane of the magnetoresistive effect film 10.

Figure 4:
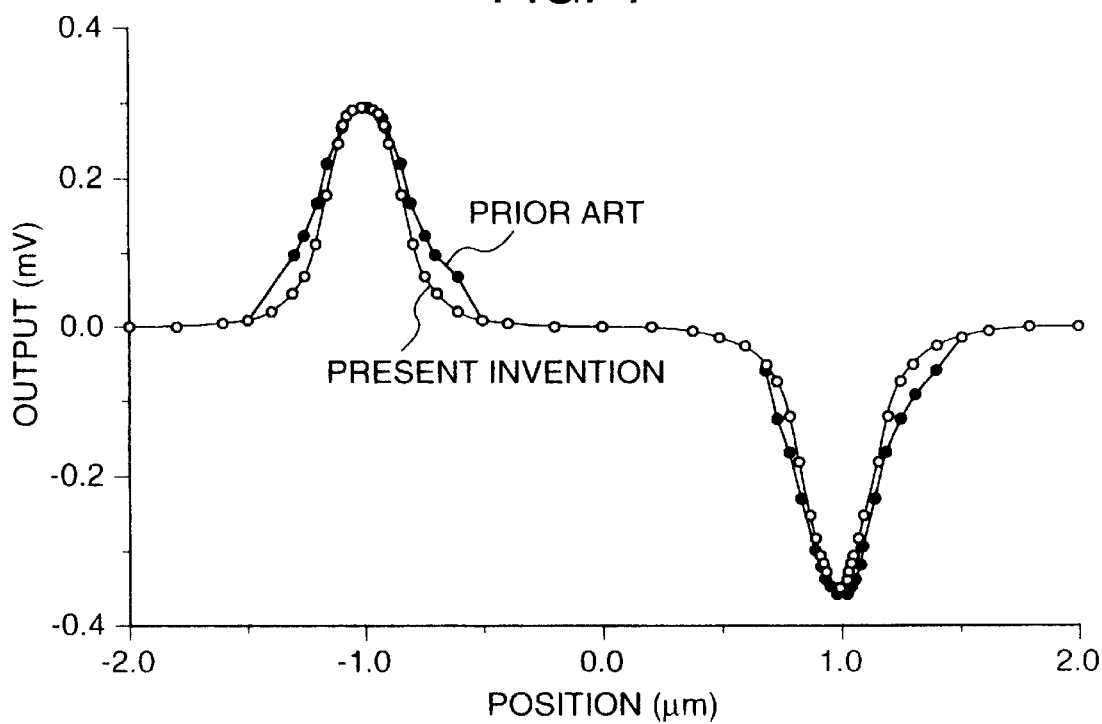
FIG. 4 shows characteristics of reproduced waveforms of the spin valve head of the present invention and a prior art spin valve head.

FIG. 4 shows a diagram of measurement of a reproduced signal by using the spin valve head of the present invention while maintaining the longitudinal bias ratio indicating the strength of the magnetic field of the magnetic domain control layer 12 to as low as 0.8. When a prior art hard bias system spin valve head is measured under the same condition, a barkhausen noise takes place in the prior art head, but in the head of the present invention, the Barkhausen noise is suppressed. This is because the electrode spacing 32 of the electrodes 14 is set to be smaller than the width 26 of the magnetoresistive effect film, no current flows at the ends of the magnetoresistive effect film 10 which are sources of the Barkhausen noise and hence the Barkhausen noise is not sensed. Thus, even if the strength of the magnetic field of the magnetic domain control layer 12 is not sufficiently high, the generation of the Barkhausen noise is suppressed, and when this head is used in the magnetic recording and reproducing apparatus, the malfunction of the magnetic recording and reproducing apparatus is reduced.

Figure 5:
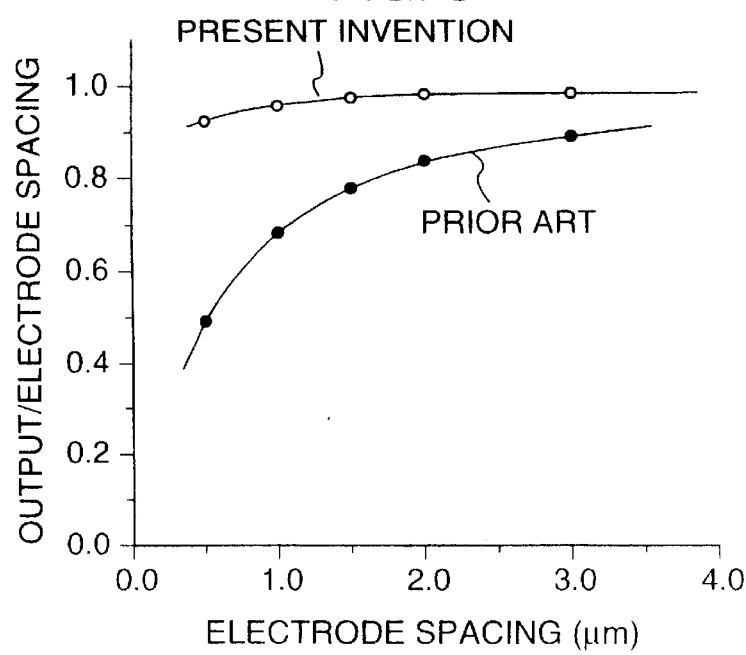
FIG. 5 shows relations between the electrode spacings and the outputs in the spin valve head of the present invention and the prior art spin valve head.

FIG. 5 shows a diagram a relation of the output (sensitivity) per unit electrode spacing and the electrode spacing when the longitudinal bias ration is 1.5, in comparison with the prior art hard bias system head. In the spin valve head of the present invention, the overlap amount corresponding to the distance 34 which the electrode 14 covers the first ferromagnetic film 18 is 0.5 $\mu$m and the width 26 of the magnetoresistive effect film is set to the electrode spacing 32 +1.0 $\mu$m.

As seen from FIG. 5, in accordance with the head of the present invention, a high sensitivity is maintained even if the electrode spacing 32 is reduced to 0.5 $\mu$m, unlike in the prior art head.

Figure 6:
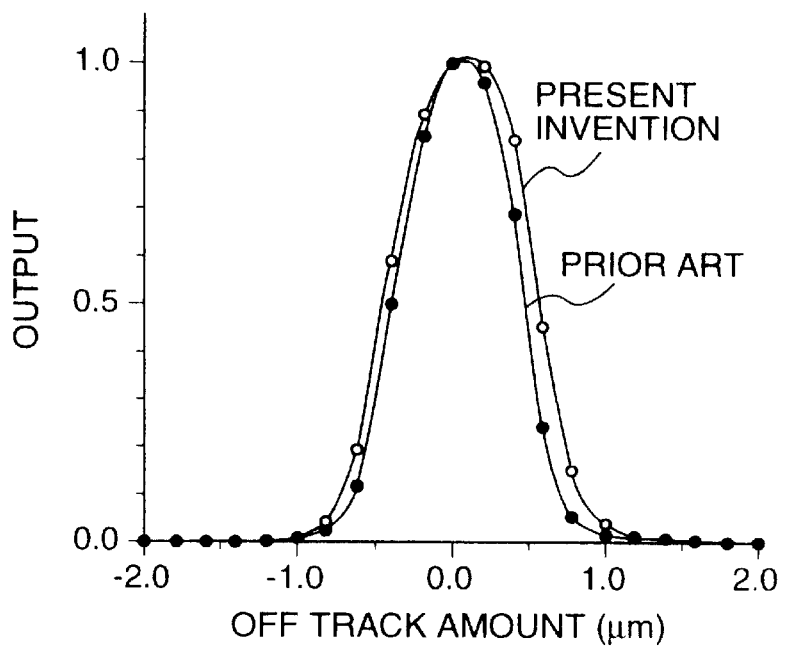
FIG. 6 shows relations between the off-track amounts and the outputs in the spin valve head of the present invention and the prior art spin valve head.

FIG. 6 shows a diagram of a microtrack characteristic for the spin valve head of the present embodiment, in comparison with the prior art head. The half width of the microtrack profile indicates the effective read width. Comparison of the half width and the electrode spacing shows the magnitude of the read spread. In FIG. 6, the overlap amount of the head of the present invention is 0.5 $\mu$m for each of left and right ends. The electrode spacing is 1.0 $\mu$m for each head. The microtrack characteristic is determined by recording a signal in a narrow track width of approximately 0.2 $\mu$m on the magnetic recording medium and reproducing with moving the signal of the microtrack under the testing head.

It is seen from FIG. 6 that a half width (effective track width) of the head of the present invention is 1.0 $\mu$m which is equal to the electrode spacing, and the read spread is small. On the other hand, in the prior art head, it is 0.9 $\mu$m which is smaller than the electrode spacing indicating the existing of dead zones.

The normalized output by the effective track width of the prior art head is 0.78 while that of the head of the present invention is 0.95 which exhibits the increase of approximately 20%. It is seen from this result that the head of the present invention is advantageous over the prior art head.

In this manner, even if the longitudinal bias ratio is large and the electrode spacing is small, the high sensitivity may be maintained with the small read spread. Thus, even if the magnetic recording and reproducing apparatus is implemented in a high track density, the malfunction of the magnetic recording and reproducing apparatus is reduced by using the head of the present invention.

Figure 7:
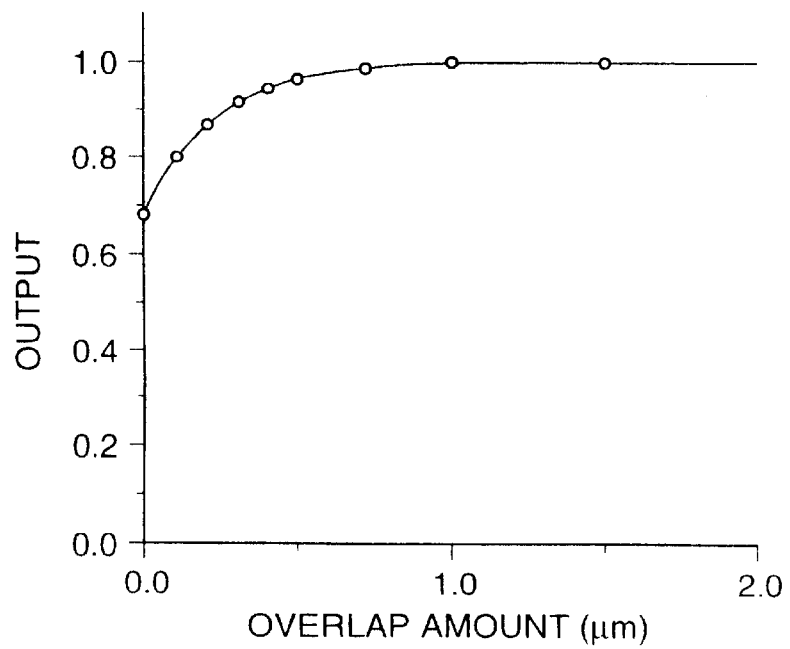
FIG. 7 shows relations between the overlap amounts and the outputs in the spin valve head of the present invention and the prior art spin valve head.

FIG. 7 shows a diagram of a measured relation of the output and the overlap amount when the electrode spacing is as small as 1 $\mu$m.

It is seen from FIG. 7 that in order to maintain the head output to not lower than 90% of its inherent output, the overlap amount may be set to not smaller than 0.25 $\mu$m. This is because no substantial current flows in the widthwise end regions of the magnetoresistive effect film 10, that is, in the low sensitivity regions and the current flows only in the high sensitivity central area so that the high output is maintained. Thus, in order to attain the high sensitivity head with the small electrode spacing, the left and right ends at the tip end of the electrode 14 are preferably arranged to be inner from the widthwise ends of the magnetoresistive effect film 10 by not smaller than 0.25 $\mu$m.

On the other hand, when the overlap amount is too large, the effect of the magnetic domain control layer 12 arranged on the opposite sides of the magnetoresistive effect film 10 does not extend to the magnetic sensing area. Namely, in the spin valve head of the present invention, the area in which the magnetization is most instable and functions as a noise generation source is the end region inside the electrode 14. This is because the twist of the biasing field by the current occurs in this region. Accordingly, it is preferable that the effective anisotropic magnetic field along the width of the magnetoresistive effect film which is larger than the biasing field by the current (approximately 5~10 Oersteds) is applied to the first ferromagnetic film 18 by the magnetic domain control layer 12 at the end region of the electrode.

Figure 8:
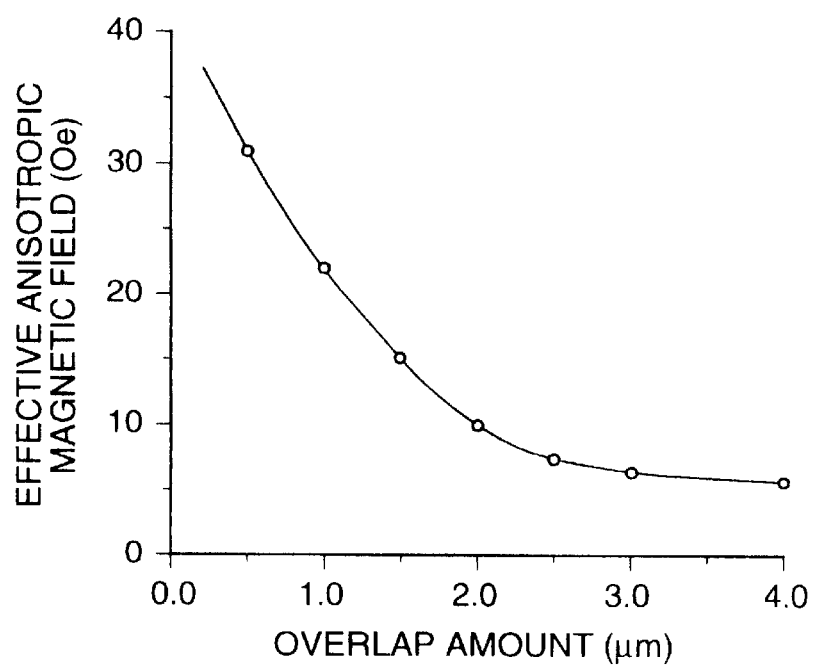
FIG. 8 shows a relation between a distance from the magnetic domain control layer and the effective anisotropic magnetic field in the spin valve head of the present invention.

FIG. 8 shows a diagram of a relation of the distance from the magnetic domain control layer 12 and the effective anisotropic magnetic field. FIG. 8 shows a distribution of the effective anisotropic magnetic field along the width of the first ferromagnetic film 18. It is assumed here that only the magnetization at the origin point is strongly bound widthwise (magnetic domain-controlled). It is seen from FIG. 8 in order to set the effective anisotropic magnetic field to not smaller than Oersteds, the distance from the magnetic domain control layer 12 may be not larger than 2 $\mu$m. This, it is preferable that the left and right end positions inside the electrode 14 (at the chop end) are arranged to be inner from the widthwise end positions of the magnetoresistive effect film 10 by not larger than 2 $\mu$m. Namely, the overlap amount for the electrode 14 is preferably in the range between 0.25 $\mu$m and 2 $\mu$m.

Figure 9:
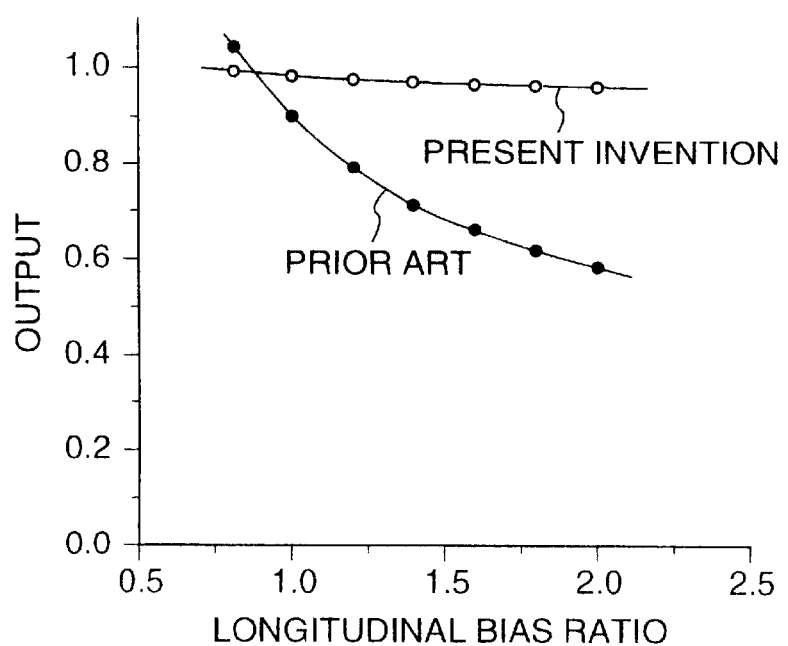
FIG. 9 shows relations between the longitudinal bias ratios and the outputs in the spin valve head of the present invention and the prior art spin valve head.

FIG. 9 shows a relation between the head output and the longitudinal bias ration when the electrode spacing is as small as 1.0 $\mu$m, in comparison with the prior art head.

It is seen from FIG. 9 that in accordance with the head of the present invention, the influence of the magnetic field of the magnetic domain control layer 12 is not applied much even if the longitudinal bias ration, that is, the magnitude of the magnetic field of the magnetic domain control layer 12 is large.

In accordance with the present embodiment, the reduction of the output may be suppressed even if the electrode spacing is reduced or the magnitude of the magnetic field of the magnetic domain control layer 12 is increased and the high output head may be provided.

By stacking the electrodes on the magnetoresistive effect layer, a contact resistance between the electrodes and the magnetoresistive effect film may be reduced (1~5 $\Omega$ in the prior art while not larger than 1 $\Omega$ in the present invention). Accordingly, the head noise and unnecessary heat generation can be suppressed.

When the head of the present embodiment is used in the following apparatus, the apparatus with reduced malfunction is attained. For example, a magnetic recording apparatus comprising a magnetic recording medium for magnetically recording information, a reproducing head for transducing a change in a magnetic field leaked from the magnetic recording medium to an electrical signal and a reproducing circuit for processing the electrical signal from the reproducing head; and an apparatus comprising, in addition to the elements of said reproducing apparatus, a recording head for generating a magnetic field representing an electrical signal and having information representing the magnetic field stored in the magnetic recording medium.

[Embodiment 2]

Figure 10:
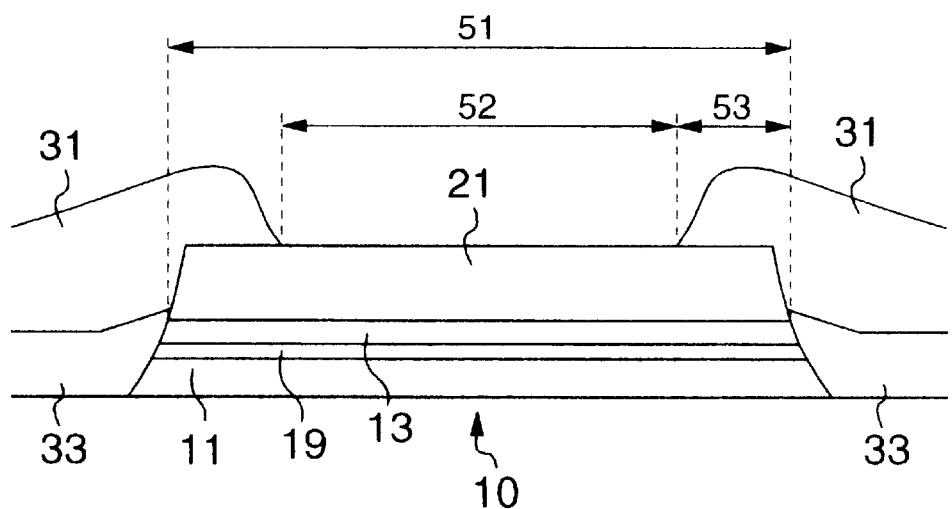
FIG. 10 to FIG. 12 show constructions of a spin valve head in accordance with an Embodiment 2 of the present invention.

FIG. 10 shows a construction of a plane facing to a medium, of a spin valve head in accordance with a second embodiment of the present invention. In FIG. 10, the spin valve head (giant magnetoresistive effect head) constructed as a reproducing magnetoresistive effect head comprises a magnetoresistive effect film 10, a magnetic domain control layer 33 and a pair of electrodes 31. The magnetoresistive effect film 10 has a plurality of films having a dimension corresponding to a track width of the magnetic recording medium stacked in a multi-layer structure.

The multi-layer film comprises a first ferromagnetic film 11, non-magnetic conductive film 19 and a second ferromagnetic film 13. An antiferromagnetic film 21 is stacked on the second ferromagnetic film 13. The magnetoresistive effect film 10 and the antiferromagnetic film 21 of the multi-layer film are stacked and the opposite ends thereof are cut out such that the width 51 of the magnetoresistive effect film 10 (which is defined by a smallest one of the widths of the first ferromagnetic film 11, the non-magnetic conductive film 19 and the second ferromagnetic film 13) is a predetermined dimension, for example, 2.0 $\mu$m. The first ferromagnetic film 11 is formed of $Ni_{80}Fe_{20}$ as a free layer and a film thickness thereof is set to an appropriate value between 2 nm and 15 nm. The first ferromagnetic film 11 as the free layer may be formed by a single layer film such as $Ni_{80}Fe_{20}$, $Ni_{68}Fe_{17}Co_{15}$, $Co_{60}Ni_{20}Fe_{20}$, $Co_{90}Fe_{10}$ or Co, or a multi-layer film having some of those films appropriately stacked. The non-magnetic conductive layer 19 may be formed of Cu and a film thickness thereof is set to an appropriate vale between 1 nm and 4 nm. The second ferromagnetic film 13 may be formed of Co as a fixed layer and a film thickness thereof is set to an appropriate value between 1 nm and 5 nm. The second ferromagnetic film 13 as the fixed layer may be a single layer film such as $Ni_{80}Fe_{20}$, $Ni_{68}Fe_{17}Co_{15}$, $Co_{60}Ni_{20}Fe_{20}$, $Co_{90}Fe_{10}$ or Co, or a multi-layer film having some of those films appropriately stacked. The antiferromagnetic film 21 may be formed of $Cr_{45}Mn_{45}Pt_{10}$ and a film thickness thereof is set to approximately 30 nm. The antiferromagnetic film 21 may be formed of $Fe_{50}Mn_{50}$, $Mn_{80}Ir_{20}$ or $Ni_{50}Mn_{50}$. The second ferromagnetic film 13 has the direction of magnetization thereof fixed to be directed to substantially the plane facing to the medium by the exchange coupling with the antiferromagnetic film 21. The direction of magnetization of the first ferromagnetic film 11 is set to the width direction of the magnetoresistive effect film and the direction of magnetization is changed to the direction normal to the plane of the drawing by the magnetic field of the magnetic recording medium. The antiferromagnetic film 21 may be substituted by the permanent magnet.

The magnetic domain control layer 33 comprises a stacked layer having a permanent magnet film and an orientation control underlying film stacked. The magnetic domain control layers are arranged on the opposite sides of the widthwise area which intersects to the stack direction of the magnetoresistive effect film 10. The permanent magnet film of the magnetic domain control layer 33 may be formed of $Co_{75}Cr_{10}Pt_{15}$ or $Co_{75}Cr_{10}Ta_{15}$ and the orientation control underlying film may be formed of Cr. The permanent magnet film of the magnetic domain control layer 33 may be formed of an alloy such as $Co_{80}Pt_{20}$, or an alloy such as $Co_{75}Cr_{10}Pt_{15}$, $Co_{75}Cr_{10}Ta_{20}$, (CoPt, CoCrPt including oxide or CoCrTa including oxide) with an oxide such as $ZrO_2$, $SiO_2$ or $Ta_2O_5$ being added. In this case, the orientation control underlying film may be omitted. The first ferromagnetic film 11 is controlled to the single magnetic domain state by the magnetic field generated by the magnetic domain control layer 33. The magnetic domain control layer 33 may be formed of a stacked layer of an antiferromagnetic film, a ferromagnetic film and an orientation control underlying film. In this case, the antiferromagnetic film may be formed of an alloy such as $Fe_{50}Mn_{50}$, $Mn_{80}Ir_{20}$, $Ni_{50}Mn_{50}$ or $Cr_{45}Mn_{45}Pt_{10}$, the ferromagnetic film may be formed of an alloy such as NiFe, CoFe or CoNi, and the orientation control underlying layer may be formed of Ta. The antiferromagnetic film may be NiO or CoO. In this case, the orientation control underlying film may be omitted.

The pair of electrodes 31 are stacked on the magnetic domain control layer 33 and a portion of each electrode is stacked on the antiferromagnetic film 21. The stack width 53 of the electrode and the antiferromagnetic film is set to 0.5 $\mu$m. Namely, since the width 51 of the magnetoresistive effect is 2.0 $\mu$m, each electrode 31 is stacked on the magnetic domain control layer 33 and the antiferromagnetic film 21 while mainlining the electrode spacing 52 to 1.0 $\mu$m. Each electrode 31 may be formed of a low resistance metal such as Ta, Au or Cu.

Figure 11:
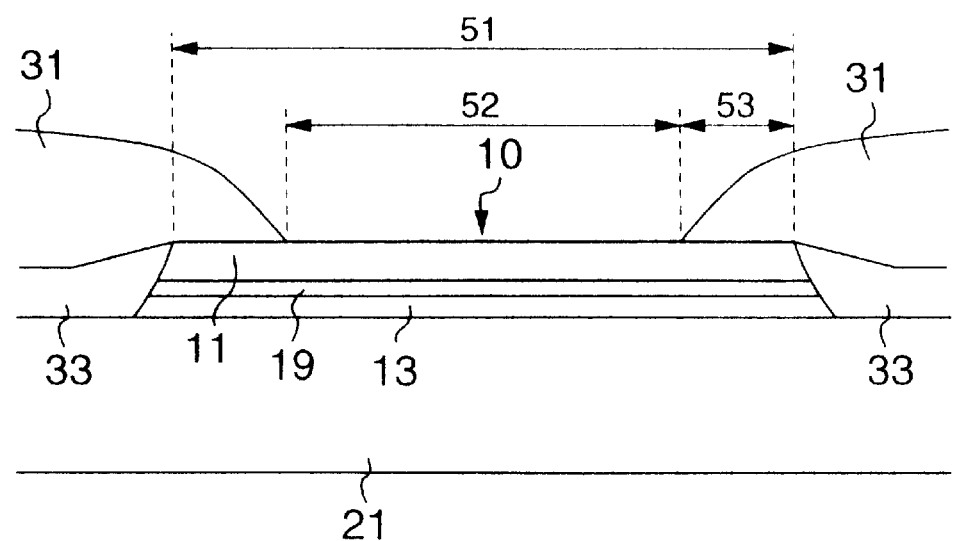

FIG. 11 shows a sectional view of a spin valve head which uses an oxide such as NiO or CoO instead of the above alloy as the antiferromagnetic film 21. As shown in FIG. 11, the stack direction of the magnetoresistive effect film 10 and the antiferromagnetic film 21 is different from that of FIG. 10 and the magnetoresistive effect film 10 is stacked on the antiferromagnetic film 21. Thus, the pair of electrodes 31 are stacked on the magnetic domain control layer 33 and a portion of each electrode is stacked on the first ferromagnetic film 11. The antiferromagnetic film 21 may be substituted by the permanent magnet. The thicknesses of the respective layers are same as those in FIG. 10.

Figure 12:
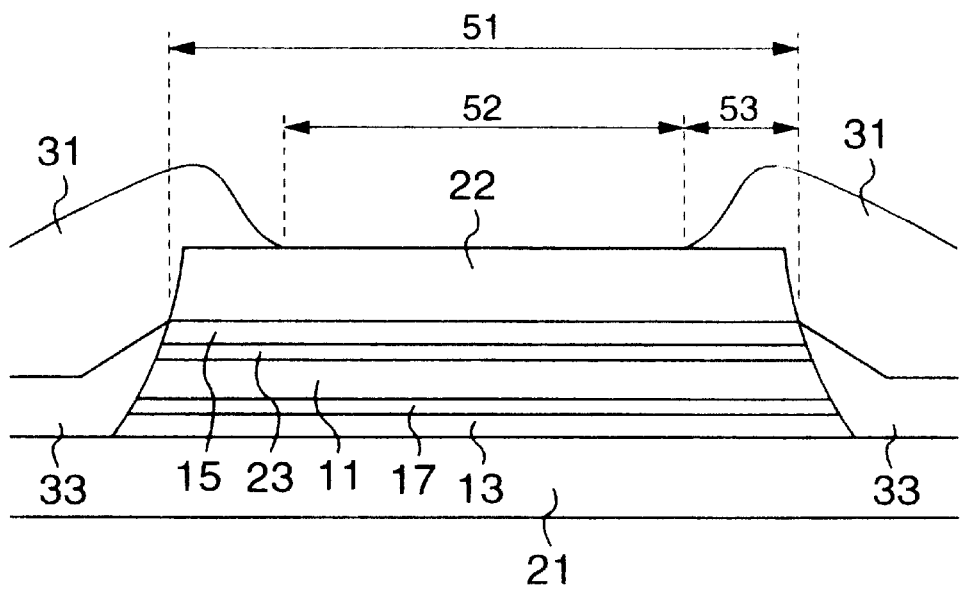

FIG. 12 shows a sectional view when a dual spin valve head which is an application of the spin valve head is used to enhance the sensitivity of the spin valve head. In this case, the magnetoresistive effect film 10 comprises sequential and direct stack of a second ferromagnetic film 13, a non-magnetic conductive film 17, a first ferromagnetic film 11, a non-magnetic conductive film 23, a third ferromagnetic film 15 and an antiferromagnetic film 22 on an antiferromagnetic film 21. The first ferromagnetic film 11 is formed of a single layer film of $Ni_{80}Fe_{20}$, $Ni_{68}Fe_{17}Co_{15}$, $Co_{60}Ni_{20}Fe_{20}$, $Co_{80}Fe_{10}$ or Co, or a multi-layer film having some of those films appropriately stacked, as a free layer and a film thickness is set to an appropriate value between 2 and 15 nm. The non-magnetic conductive film 17 and the non-magnetic conductive film 23 may be formed of Cu and a film thickness is set to an appropriate value between 1 nm and 4 nm. The second ferromagnetic film 13 and the third ferromagnetic film 15 may be formed of a single layer film such as Co, $Ni_{80}Fe_{20}$, $Ni_{68}Fe_{17}Co_{15}$, $Co_{60}Ni_{20}Fe_{20}$, or $Co_{90}Fe_{19}$, or a multi-layer film having some of those films appropriately stacked, as a pinned layer and a film thickness is set to an appropriate value between 1 nm and 5 nm. The antiferromagnetic films 21 and 22 may be formed of an alloy such as $Fe_{20}Mn_{50}$, $Mn_{80}Ir_{20}$, $Ni_{50}Mn_{50}$ or $Cr_{45}Mn_{45}Pt_{10}$, or an oxide such as NiO or CoO. The antiferromagnetic films 21 and 22 may be formed of the same material or different materials, or they may be substituted by the permanent magnets. The thicknesses of the respective layers are same as those in FIG. 10.

The positions and the thickness of the magnetic domain control layer in FIGS. 10–13 have the same relations as those in the Embodiment 1.

A characteristic of the head shown in FIG. 10 as an example of the spin valve head of the present invention is shown below.

Figure 13:
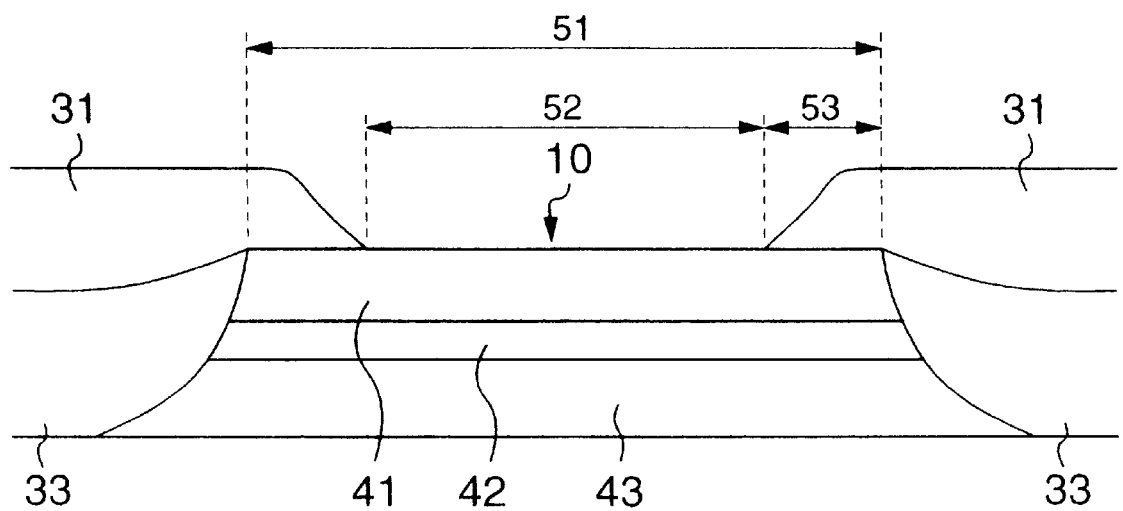
FIG. 13 shows a construction of a conventional (prior art) AMR head in accordance with the Embodiment 2 of the present invention.
Figure 14:
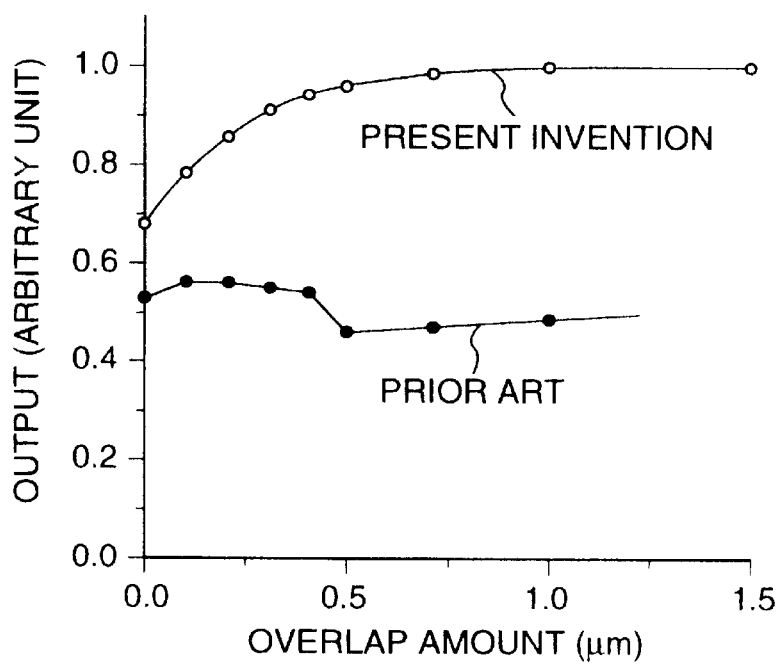
FIG. 14 shows a diagram of relations between the outputs and the overlap amounts of the spin valve head of the present invention and the prior art AMR head.

FIG. 14 shows a comparison of reproduction characteristics of the spin valve head shown in FIG. 10 and a comparative AMR head having a portion of the electrode formed on the magnetoresistive effect film shown in FIG. 13. In the AMR head shown in FIG. 13, the magnetoresistive effect film 10 comprises a stacked layer of an MR film 41, an intermediate Ta layer 42 and a SAL 43. The head reproduction output was measured while changing the width 53 of the area on which the electrode 31 is stacked on the antiferromagnetic 21 or the MR film 41 (the distance from the magnetic domain control layer 33 to the end of the electrode 31 (overlap amount)). The electrode spacing 52 is fixed to 1.0 $\mu$m, and when the overlap amount 53 is changed, the width 51 of the magnetoresistive effect film is also changed. As shown in FIG. 14, for the comparative AMR head of FIG. 13, the output does not increase significantly even if the overlap amount 53 is increased. On the other hand, for the spin valve head of the present invention, the increase of the output is significant when the overlap amount 53 is increased. The increase of the output in the spin valve head is due to the fact that no substantial current is flown in the widthwise end regions of the magnetoresistive effect film 10 at which the sensitivity is low because of the influence by the magnetic domain control layer 33, by overlapping it by the electrode 31 and only the output of the high sensitivity central area is taken out. On the other hand, it has been proved that this effect does is not prominently observed in the AMR head because the magnetization status in the area in which the electrode 31 of the magnetoresistive effect film 10 overlaps is significantly different from that of non-overlapped area so that the output is reduced and it cancels the increment of the output. The difference in the magnetization state due to the overlap and non-overlap is very small in the spin valve head of the present invention. This is due to the fact that the magnetization state of the second ferromagnetic film 13 is hard to be changed by the current. Accordingly, the spin valve head of the present invention offers an effect of enhancing the output by forming the portion of the electrode 31 on the antiferromagnetic film 21.

An optimum value of the overlap amount was then determined. It is seen from FIG. 14 that in order to maintain the output of the head of the present invention to not smaller than 90% of its maximum value, the overlap amount 53 may be not smaller than 0.25 $\mu$m. Thus in order to attain the high sensitivity head with the narrow electrode spacing, it is preferable that the left and right ends at the tip end of the electrode 31 are arranged to be inner than the widthwise ends of the magnetoresistive effect film 10 by not smaller than 0.25 $\mu$m. On the other hand, when the overlap amount is too large, the effect of the magnetic domain control layer 33 arranged on the opposite sides of the magnetoresistive effect film 10 does not extend to the magnetic sensing area. Namely, in the spin valve head of the present invention, the area in which the magnetization is most instable and functions as a noise generation source is the end region at the tip end of the electrode 31. This is because the difference between the presence and absence of the biasing magnetic field by the current is created on the boundary of this region. Accordingly, it is preferable that the effective anisotropic magnetic field along the width of the magnetoresistive effect film 10 which is higher than the biasing magnetic field by the current (approximately 5 to 10 Oersteds) is applied to the first ferromagnetic film 11 by the magnetic domain control layer 33 at the end positions of the electrode.

Figure 15:
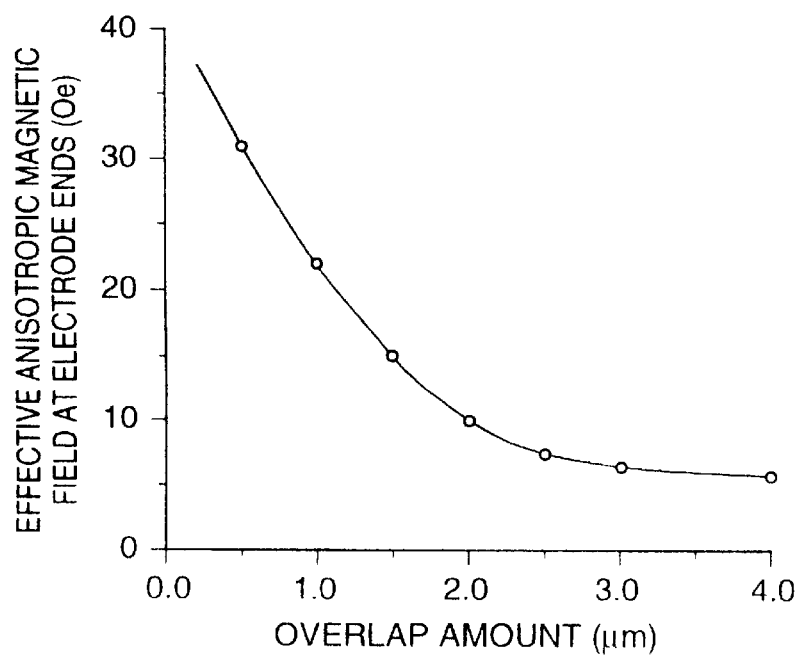
FIG. 15 shows a diagram of a relation between the effective anisotropic magnetic field and the overlap amount in the present invention.

FIG. 15 shows a diagram of a relation between the overlap amount 53 and the effective anisotropic magnetic field along the width of the magnetoresistive effect film 10 at the electrode end. It is seen from FIG. 15 that in order to maintain the effective anisotropic magnetic field at the electrode end position to not smaller than 10 Oersteds, the overlap amount 53 may be not larger than 2 $\mu$m. Thus, it is preferable that the left and right end positions of at the tip end of the electrode 31 are arranged to be inner than the widthwise end positions of the magnetoresistive effect film 10 by not larger than 2 $\mu$m. Namely, the overlap amount 53 for the electrode 31 is preferably in the range between 0.25 $\mu$m and 2 $\mu$m.

Figure 16:
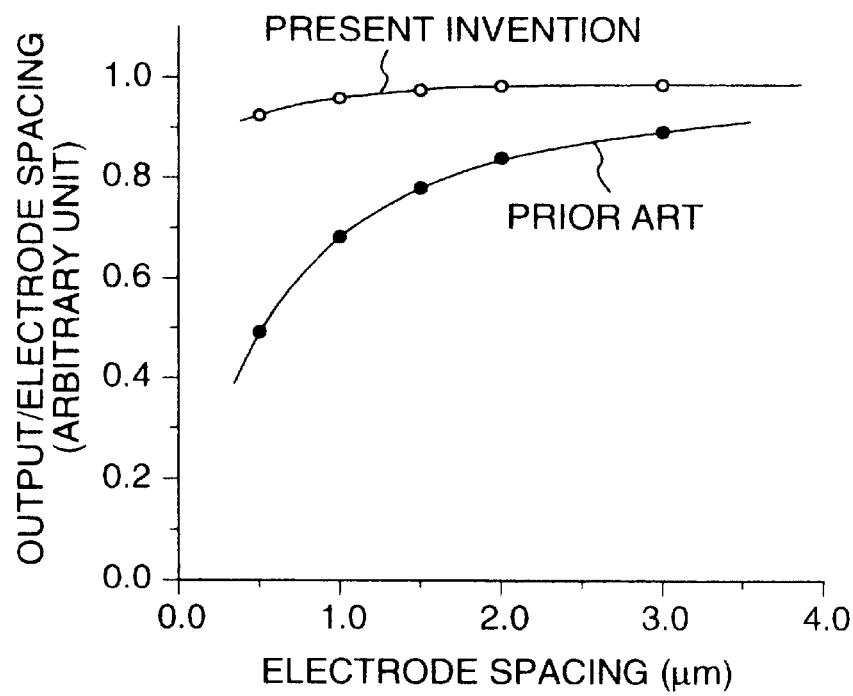
FIG. 16 shows a diagram of a relation between the effective anisotropic magnetic field and the overlap amount in the present invention.

FIG. 16 shows a diagram of a relation between the output per unit electrode spacing (1 $\mu$m), that is, the sensitivity and the electrode spacing for the spin valve head with the overlap of the present invention and the prior art head without the overlap. In the spin valve head of the present invention, the overlap amount corresponding to the width which the electrode 32 covers the antiferromagnetic film 21 is 0.5 $\mu$m, and the width 51 of the magnetoresistive effect film is set to the electrode spacing 52 plus 1.0 $\mu$m. It is seen from FIG. 16 that in accordance with the head of the present invention, the high sensitivity is maintained even when the electrode spacing is as small as 0.5 $\mu$m as opposed to the prior art head.

In the spin valve head of the present invention, because the electrode 31 is stacked on the portion of the antiferromagnetic film 21, the magnitude of the read spread was measured by the microtrack characteristic for comparison with the prior art. The electrode spacing is 1.0 $\mu$m in each case. The microtrack characteristic is determined by recording a signal in a narrow area having a track width of approximately 0.2 $\mu$m on the magnetic recording medium, and moving the signal of the microtrack under the head. In the head of the present invention in which the overlap amount 53 is set to 0.5 $\mu$m, the half-value width of the microtrack characteristic, that is, the effective track width is 1.0 $\mu$m which is equal to the electrode spacing, and the read spread is small. On the other hand, in the prior art head, the effective track width is 0.9 $\mu$m which is rather narrower than the electrode spacing. Thus, the outputs of the head of the present invention and the prior art head were normalized by the effective track width for comparison. As a result, the normalized output of the prior art head is 0.78 while that of the head of the present invention is 0.95 which is higher by approximately 20%. It is seen from the above result that the head of the present invention is advantageous over the prior art head.

In this manner, since the high sensitivity may be maintained and the read spread is small even if the electrode spacing is small, when the magnetic recording and reproducing apparatus is implemented in high track density, the malfunction of the magnetic recording and reproducing apparatus may be reduced by using the head of the present invention.

Figure 17:
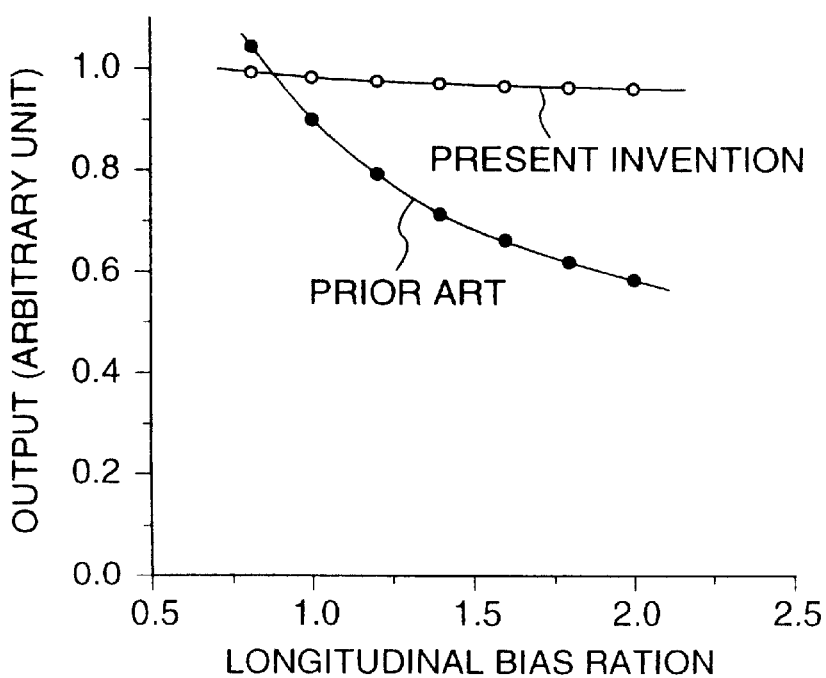
FIG. 17 shows a diagram of a relation between the effective anisotropic magnetic field and the overlap amount in the present invention.

FIG. 17 shows a diagram of a relation between the output of the head and the longitudinal bias ratio when the electrode spacing is as small as 1.0 $\mu$m, in comparison with the prior art head. As shown in FIG. 17, in accordance with the head of the present invention, even if the longitudinal bias ration indicating the strength of the magnetic field generated by the magnetic domain control layer includes variation, the influence thereof is not directly presented and the variation in the output can be suppressed low. Thus, when the head of the present invention is used, the head with a high yield can be provided. Further, since the high sensitivity may be maintained even if the longitudinal bias ration is high, the malfunction of the magnetic recording and reproducing apparatus may be reduced by using the head of the present invention and the magnetic recording and reproducing apparatus may be operated with a low power.

Figure 18:
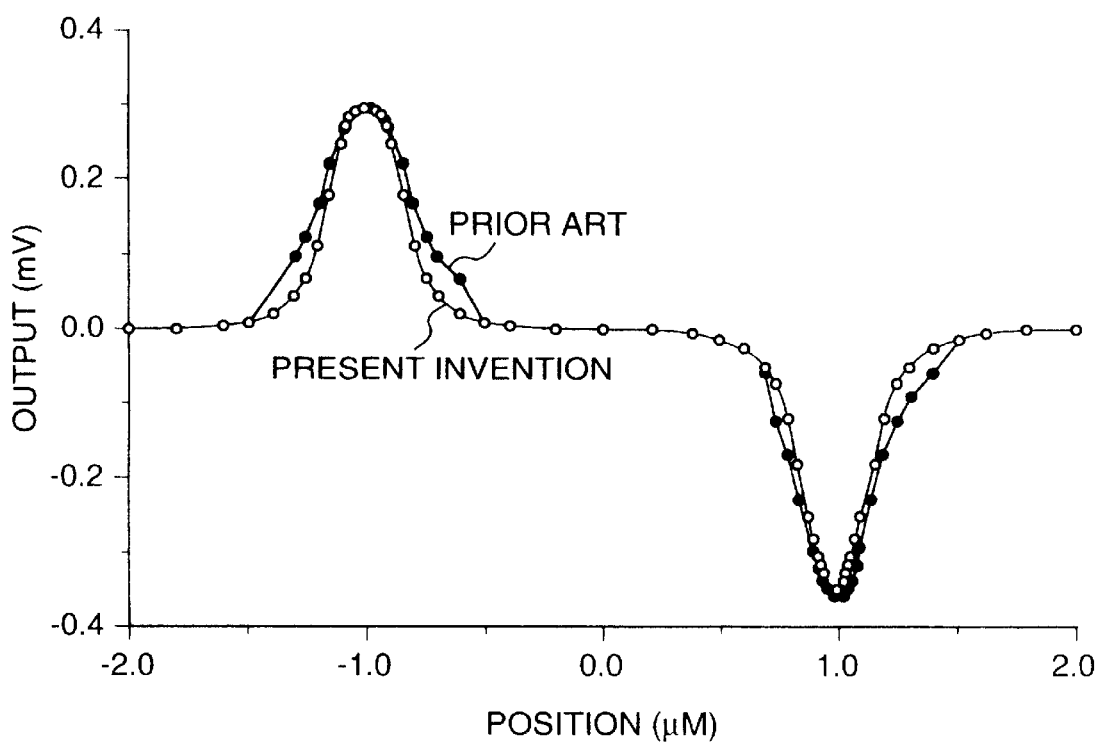
FIG. 18 shows a diagram of a relation between the effective anisotropic magnetic field and the overlap amount in the present invention.

FIG. 18 shows a diagram of the measurement of the reproduced signal by using the spin valve head of the present invention while setting the longitudinal bias ration to as low as 0.8. The spin valve head of the prior art was also measured under the same condition. In the prior art head, the discontinuity of signal called the Barkhausen noise is observed while in the head of the present invention, the Barkhausen noise is suppressed. This is because the spacing 52 of the electrodes 31 is set narrower than the width 51 of the magnetoresistive effect film and no current flows in the end regions of the magnetoresistive effect film 10 which are sources of generation of the Barkhausen noise so that the Barkhausen noise is not sensed. Thus, even if the strength of the magnetic domain control layer 32 is sufficiently high, the generation of the Barkhausen noise is suppressed, and when this head is used in the magnetic recording and reproducing apparatus, the malfunction of the magnetic recording and reproducing apparatus may be reduced.

By stacking the electrodes on the magnetoresistive effect layer, a contact resistance between the electrodes and the magnetoresistive effect film may be reduced (1~5 Ω in the prior art while not larger than 1 Ω in the present invention). Accordingly, the head noise and unnecessary heat generation can be suppressed.

[Embodiment 3]

Figure 19:
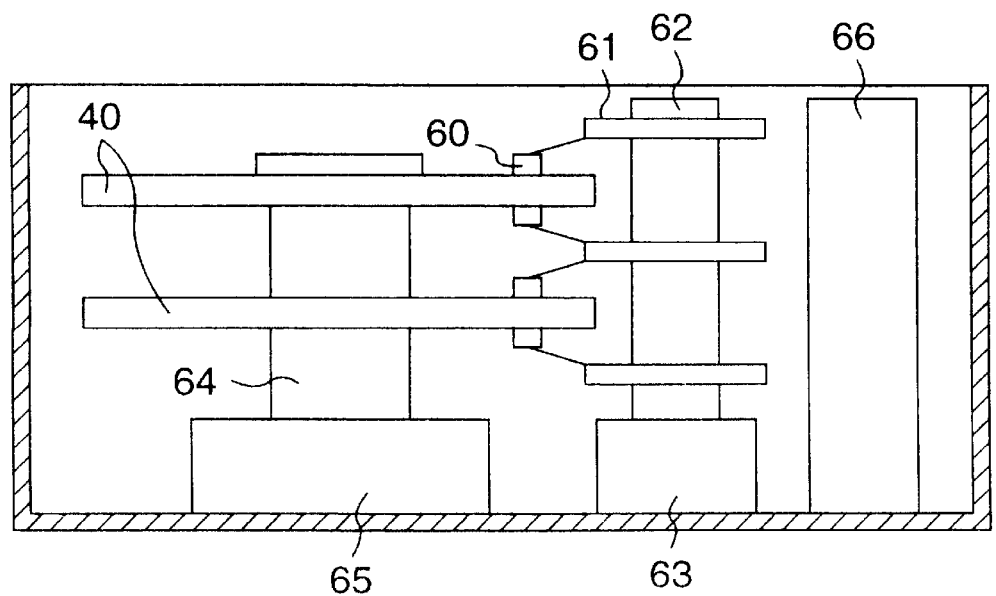
FIG. 19 shows a hard disk apparatus of the present invention.

FIG. 19 shows a schematic view of a hard disk apparatus using the spin valve head shown in the Embodiments 1 and 2 as the magnetoresistive effect reproducing head. The present apparatus is provided with a disk rotating shaft 64 and a spindle motor 65 for rotating it at a high speed, and one or plurality of (two in the present embodiment) disks 40 are mounted on the disk rotating shaft 64 at a predetermined interval. Thus, each disk 40 is rotated in union with the disk rotating shaft 64. The disk 40 is a disk having predetermined radius and thickness, and permanent magnet films are formed on both surfaces thereof to form information recording planes. The present apparatus is also provided with a head positioning rotating shaft 62 outside of the disk 40 and a voice coil motor 63 for driving it, and a plurality of access arms 61 are mounted on the head positioning rotating shaft 62, and recording and reproducing heads (hereinafter referred to as heads) 60 are mounted at a tip end of each access arm 61. Thus, when the head positioning rotating shaft 62 is rotated by a predetermined angle, each head 60 is moved radially on the disk 40 and positioned to a predetermined position. Each head 60 is held at a height of several terns nm from the surface of the disk 40 by a balance between a floating force generated when the disk 40 is rotated at a high speed and a pressure by gimbals which is a resilient member forming a part of the access arm 61. The spindle motor 65 and the voice coil 63 are connected to a hard disk controller 66 which controls the rotating speed of the disk 40 and the position of the head 60.

Figure 20:
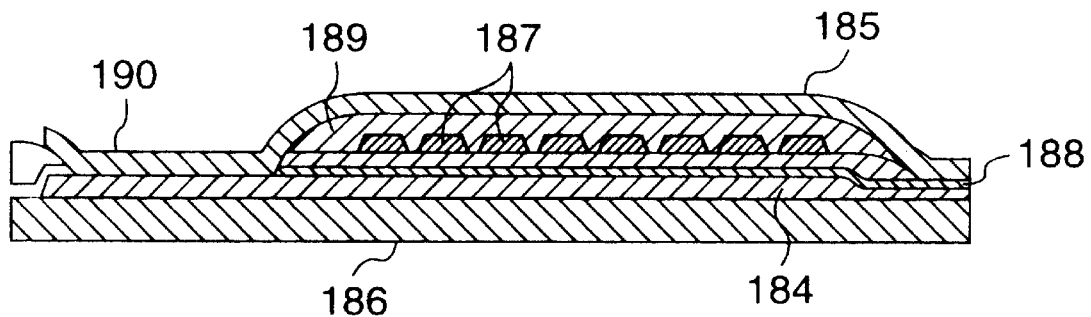
FIG. 20 shows a sectional view of an inductive type magnetic recording head of the present invention.

FIG. 20 shows a sectional view of an inductive type recording head of the present invention. The present thin film head comprises an upper shield film 186, a lower magnetic film 184 deposited thereon, and an upper magnetic film 185. A non-magnetic insulating material 189 is deposited between those magnetic films. A portion of the insulating material defines a magnetic gap 188. A support is in a shape of a slider having an air bearing surface (ABS) and it is in a close and floating relation to the disk medium which is rotated during a disk file operation.

The magnetic thin film head has a back gap 190 formed the upper magnetic film 185 and the lower magnetic film 184. The back gap 190 is spaced from the magnetic gap by an interleaving coil 187.

The continuous coil 187 may be formed by plating on the lower magnetic layer 184 and is electro-magnetically coupled thereto. A center of the coil 187 is filled with an insulating material 189 and an electrical contact is provided therein, and a larger region is defined as an electrical contact at an end of an outer terminal of the coil. The contacts are connected to external wires and a read/write signal processing head circuit (not shown).

In the present invention, the coil 187 constructed by the single layer is of somewhat distorted ellipsoidal form, and an area having a small sectional area is arranged closest to the magnetic gap, and the sectional area gradually increases as it is farther from the magnetic gap.

The elliptic coils are arranged between the back gap 190 and the magnetic gap 188 at a relatively high density and the width or section diameter of the coil is small in this area. Further, the large section diameter at the area farthest from the magnetic gap causes the reduction of the electrical resistance. The elliptic (oval) coil does not have corner or sharp edge and the resistance to the current is low. The elliptic shape reduces the total length of the conductor, as compared with a rectangular or circular (ring) coil. By those advantages, the total resistance of the coil is relatively low, the heat generation is low and appropriate heat dissipation is attained. Since substantial amount of heat is reduced, the break, expansion and shrinkage of the thin film layer are prevented and the cause of the ball tip protrusion at the ABS is removed.

The elliptic coil in which the width changes substantially uniformly may be deposited by a conventional inexpensive plating technique such as sputtering or vapor deposition. In a coil of other shape, particularly in the coil having corners, the deposition by the plating is apt to be non-uniform. The removal of the corners or sharp edges presents less mechanical stress to the final coil.

In the present embodiment, the coil formed by a number of windings is formed between the magnetic cores in substantially elliptic shape, and the section diameter of the coil gradually increases as it goes from the magnetic gap to the back gap so that the signal output increases and the heat generation decreases.

In the present embodiment, the upper and lower magnetic films of the inductive type recording head are formed by the following electric plating method.

The inductive type thin film magnetic head having the upper and lower magnetic cores frame-plated under the condition of pH: 3.0 and the plating electric density: 15 mA/cm$^2$ in the plating bath containing Ni$^{++}$: 16.7 g/l and Fe$^{++}$: 2.4 g/l and conventional stress relaxing agent and surface activating agent was formed. The track width is 4.0 $\mu$m and the gap length is 0.4 $\mu$m. The composition of the magnetic film is 42.4 Ni—Fe (% by weight), and the magnetic properties are; a saturation magnetic flux density (B$_s$): 1.64T, a hard axis corecivity (H$_{CH}$): 0.5 Oe and a specific resistivity ($\rho$): 48.1 $\mu\Omega$cm. The upper magnetic core 85, the lower magnetic core 84 which also serves as the upper shield layer and the coil 87, the magnetoresistive effect element 86, the electrode for supplying a sense current to the magnetoresistive effect element, the lower shield layer and the slider are provided. The crystal grain diameter of the magnetic core of the present embodiment is 100–500 Å and the hard axis corecivity is not larger than 1.0 Oe.

The performance (overwite characteristic) of the recording head of the present invention thus formed was measured and it exhibited an excellent recording performance of approximately −50 dB in a high frequency area of 40 MHz or higher.

Figure 21:
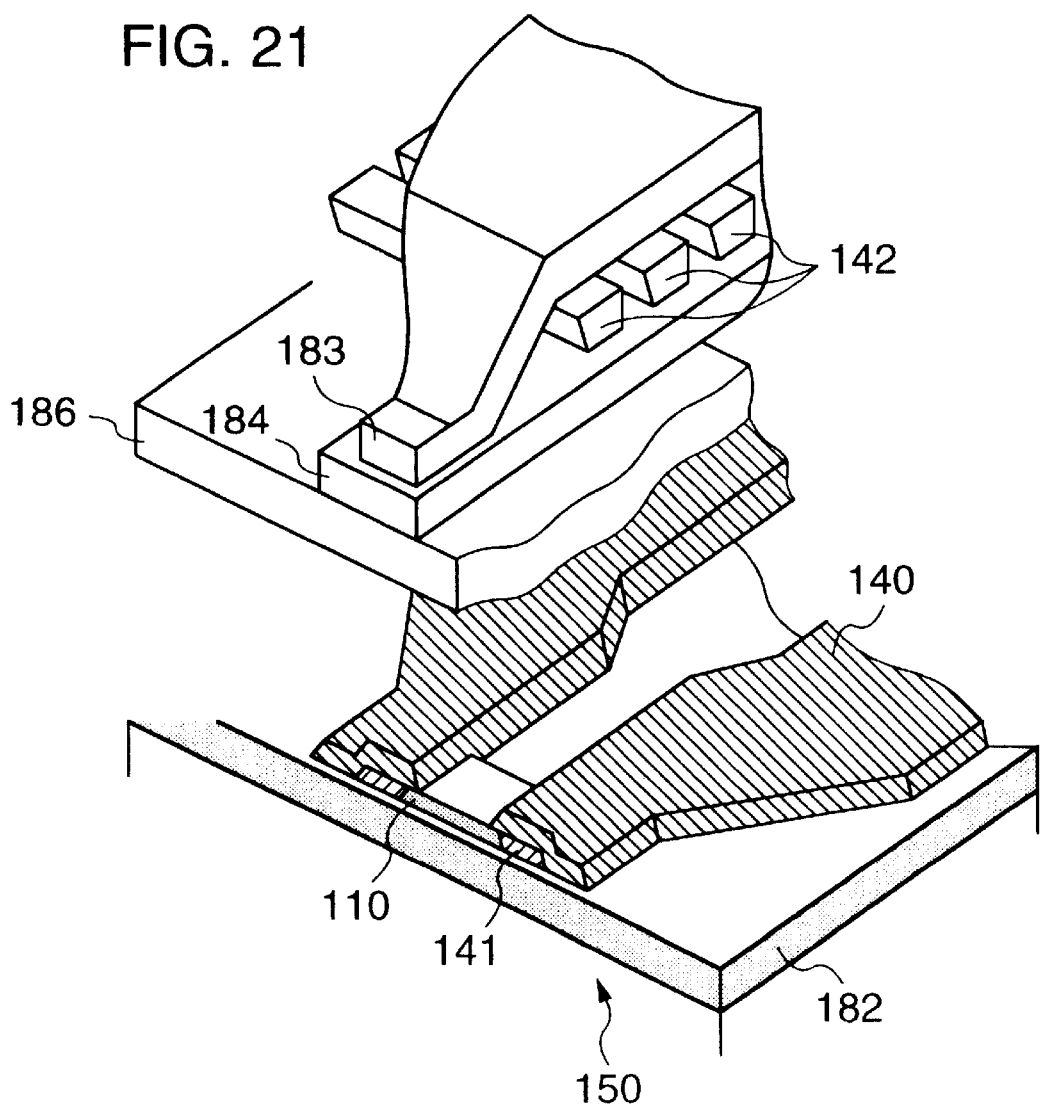
FIG. 21 shows a partial perspective view of an integration of an inductive type magnetic recording head and a magnetoresistive effect reproducing head of the present invention.

FIG. 21 shows a perspective conceptual view of a magnetic head having the inductive type recording head of the present invention and the magnetoresistive effect reproducing head. The recording head having a lower shield 182, a magnetoresistive effect film 110, a magnetic domain control film 141 and electrode terminals 140, a lower magnetic film 184 and an upper magnetic film 183 are formed on a base 150 which also serves as a slider. A lower gap and an upper gap are omitted in the drawing, and the coil 142 creates a magnetomotive force in the upper magnetic core and the upper shield/lower core by the electromagnetic induction effect to from the inductive type recording head.

Figure 22:
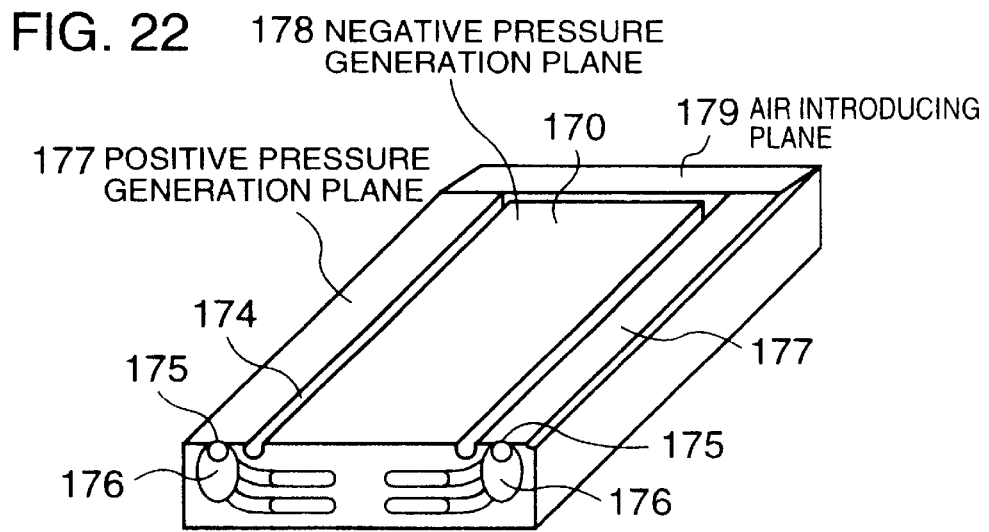
FIG. 22 shows a perspective view of a negative pressure slider of the present invention.

FIG. 22 shows a perspective view of a negative pressure slider. The negative pressure slider 170 has a negative pressure generation plane 178 surrounded by an air introducing plane 171 and two positive pressure generation planes 177 for generating a floating force and further comprises an air introducing plane 179 and a groove 174 having a larger step than the negative pressure generation plane 178 at the boundary of the two positive pressure generation planes 177 and the negative pressure generation plane 178. At an air flow-out end 175, an inductive type recording head to be described later for recording the information of the magnetic disk and an MR sensor for reproducing the information form the record/reproduction separate type thin film magnetic head element 176 shown in FIG. 21.

When the negative pressure slider 170 floats, the air introduced from the air introduction plane 179 is inflated in the pressure generation plane 178 but since the air flow directed to the groove 174 is also formed, the air flow from the air introduction plane 179 to the air flow-out end 175 is present in the groove 174. Accordingly, even if the dusts floating in the air is introduced from the air introduction plane 171 when the negative pressure slider 170 floats, they are introduced into the groove 174 and flown by the air flow in the groove 174 and ejected out of the negative pressure slider 170 from the air flow-out end 178. Further, since the air flow is always present in the groove 174 when the negative pressure slider 170 floats and there is no stagnation of air, the cohesion of dusts does not take place.

Figure 23:
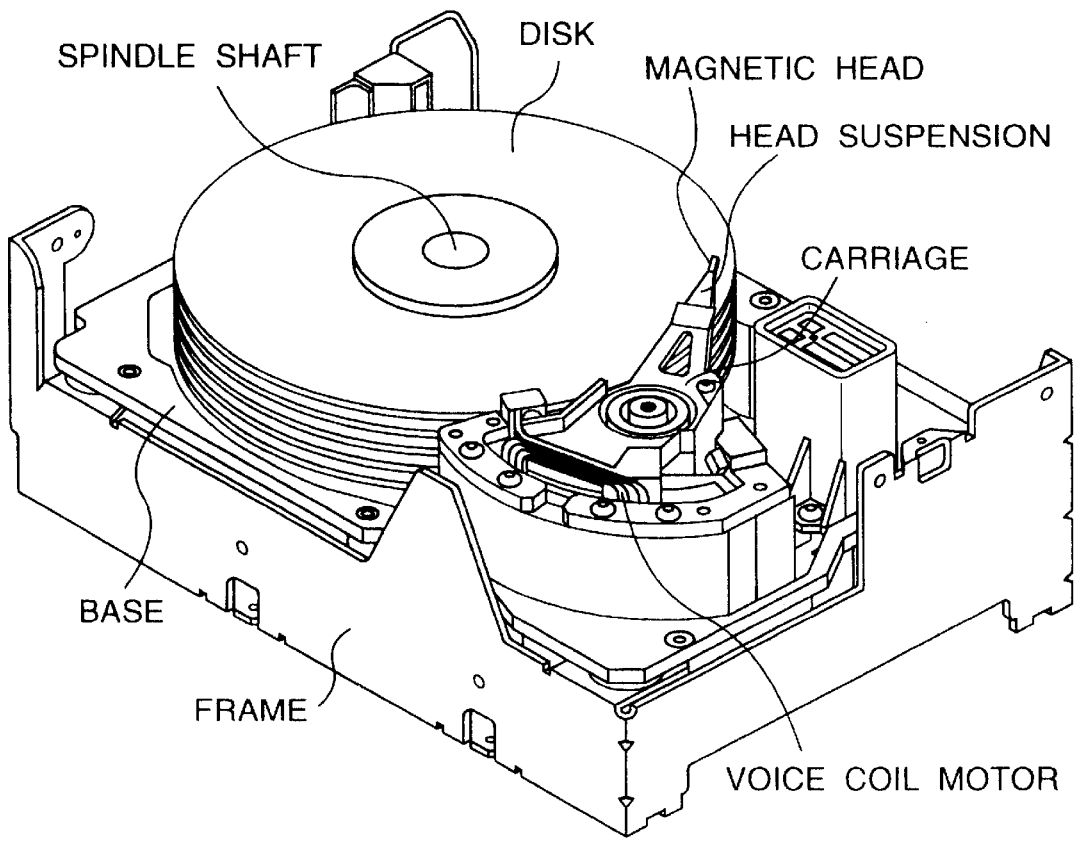
FIG. 23 shows an overall view of the magnetic disk apparatus of the present invention.

FIG. 23 shows an overall perspective view of a magnetic disk apparatus in accordance with the embodiment of the present invention. The present magnetic disk apparatus comprises a magnetic disk for recording information, a DC motor (not show) as means for rotating the magnetic disk, magnetic heads for writing and reading the information, a positioning unit as means for supporting the magnetic heads and changing the position thereof relative to the magnetic disk, that is, an actuator and a voice coil motor. The voice coil motor comprises a voice coil and a magnet. In FIG. 23, five magnetic disks are mounted on one rotating shaft to increase the total storage capacity.

The present embodiment allows the recording at a high frequency region for a high corecivity medium, and a high sensitivity MR sensor having a medium transfer rate of not smaller than 15 MB/sec, a recording frequency of not smaller than 45 MHz, high speed data transfer at not lower than 400 rpm of the magnetic disk, a reduced access time, an increased record capacity and an excellent MR effect is attained. Thus, the magnetic disk apparatus having a surface recording density of not smaller than 3 GB/in$^2$ is attained.

Figure 24:
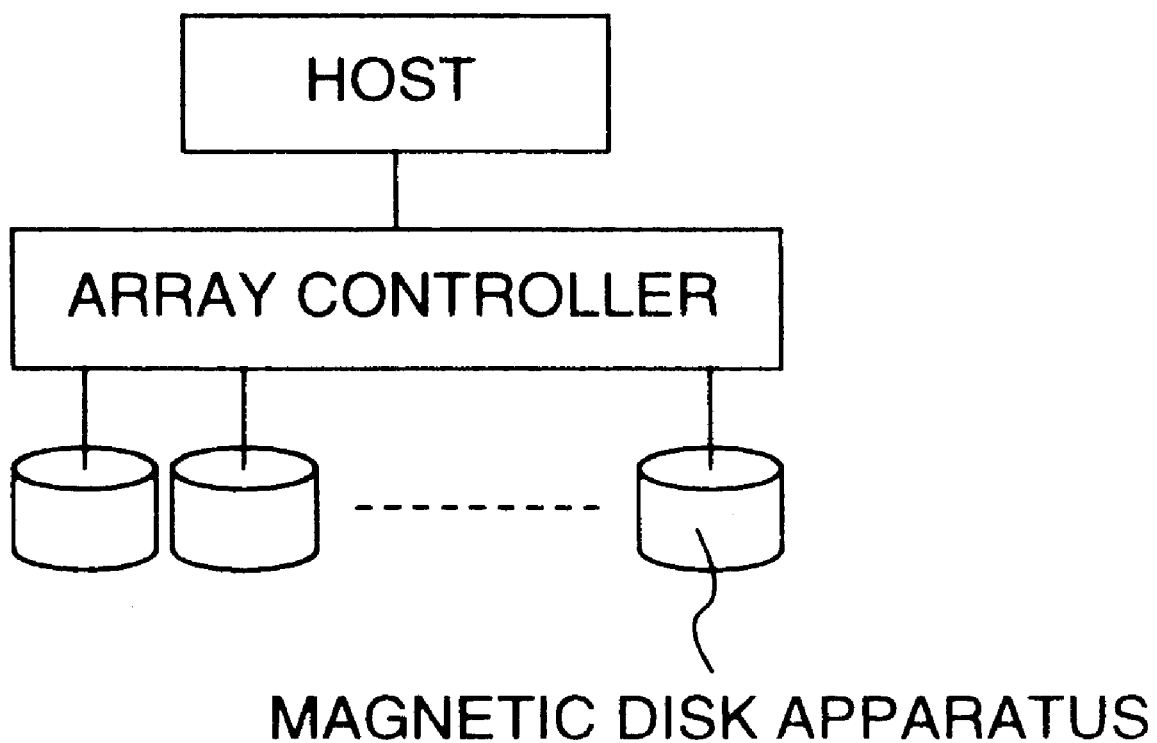
FIG. 24 shows a conceptual view of the magnetic disk array apparatus of the present invention.

FIG. 24 shows a disk array assembled by combining a plurality of above magnetic recording and reproducing apparatus. In this case, since the plurality of magnetic recording and reproducing apparatus are handled simultaneously, the information processing ability is fast and the reliability of the apparats is enhanced. Naturally, the performance of each magnetic recording and reproducing apparatus (low error rate and low power consumption) should be high and the high performance combined heads are essential for this purpose.

What is claimed is:

1. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
a first ferromagnetic film of single-layer or multi-layer construction having a direction of magnetization thereof changed by a magnetic field from a magnetic recording medium,
a second ferromagnetic film of single-layer or multi-layer construction having a direction of magnetization thereof fixed,
a non-magnetic conductive film inserted between said first ferromagnetic film and said second ferromagnetic film, and
an antiferromagnetic film or permanent magnet film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said magnetoresistive effect film; and a spacing of said electrodes being narrower than a width of said magnetoresistive effect film.

2. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
a first ferromagnetic film of single-layer or multi-layer construction having a direction of magnetization thereof changed by a magnetic field from a magnetic recording medium,
a second ferromagnetic film of single-layer or multi-layer construction having a direction of magnetization thereof fixed,
a non-magnetic conductive film inserted between said first ferromagnetic film and said second ferromagnetic film, and
an antiferromagnetic film or permanent magnet film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said antiferromagnetic film or permanent magnet film; and a spacing of said electrodes being narrower than a width of said magnetoresistive effect film.

3. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- second and third ferromagnetic films of single-layer or multi-layer construction having a direction of magnetization thereof fixed,
- a first non-magnetic conductive film inserted between said first ferromagnetic film and said second ferromagnetic film, and
- a second non-magnetic conductive film inserted between said first ferromagnetic film and said third ferromagnetic film;

said magnetic domain control layers contacting end faces of said first ferromagnetic film and said second ferromagnetic film;

said first ferromagnetic film being stacked on said second ferromagnetic film;

said third ferromagnetic film being stacked on said first ferromagnetic film; and antiferromagnetic films or permanent magnet films disposed at positions effective for fixing the directions of magnetization of said second and third ferromagnetic films;

portions of said pair of electrodes being stacked on said antiferromagnetic films or permanent magnet films for fixing the direction of magnetization of said third ferromagnetic film; and a spacing of said electrodes being narrower than a width of said magnetoresistive effect film.

4. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film or permanent magnet film on which said second ferromagnetic film is stacked for fixing the direction of magnetization of said second ferromagnetic film;

said magnetic domain control layers contacting end faces of said first ferromagnetic film and said second ferromagnetic film;

said pair of electrodes being arranged at positions to flow current only at a central area of said magnetoresistive effect film.

5. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film or permanent magnet film stacked on said second ferromagnetic film for fixing the direction of magnetization of said second ferromagnetic film;

said magnetic domain control layers contacting end faces of said first ferromagnetic film and said second ferromagnetic film;

said pair of electrodes being arranged at positions to flow current only at a central area of said magnetoresistive effect film.

6. A magnetoresistive effect head comprising:

a magnetoresistive effect film having a plurality of stacked films;

magnetic domain control layers arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- second and third ferromagnetic films of single-layer or multi-layer construction having a direction of magnetization thereof fixed,
- a first non-magnetic conductive film inserted between said first ferromagnetic film and said second ferromagnetic film, and a second non-magnetic conductive film inserted between said first ferromagnetic film and said third ferromagnetic film;

said magnetic domain control layers contacting end faces of said first ferromagnetic film and said second ferromagnetic film;
said first ferromagnetic film being stacked on said second ferromagnetic film;
said third ferromagnetic film being stacked on said first ferromagnetic film; and
antiferromagnetic films or permanent magnet films disposed at positions effective for fixing the directions of magnetization of said second and third ferromagnetic films;
said pair of electrodes being arranged at positions to flow current only at a central area of said magnetoresistive effect film.

7. A magnetoresistive effect head comprising:
a magnetoresistive effect film having a plurality of stacked films;
magnetic domain control layers arranged at opposite ends of said magnetoresistive effect film in a track width direction of said magnetoresistive effect head; and
a pair of electrodes stacked on said magnetic domain control layers and electrically connected to said magnetoresistive effect film;
said magnetoresistive effect film including
a first ferromagnetic film of single-layer or multi-layer construction having a direction of magnetization thereof changed by a magnetic field from a magnetic recording medium and arranged adjacent to said electrodes,
a second ferromagnetic film of single-layer or multi-layer construction having a direction of magnetization thereof fixed,
a non-magnetic conductive film inserted between said first ferromagnetic film and said second ferromagnetic film, and
an antiferromagnetic film or permanent magnet film disposed at a position effective for fixing the direction of magnetization of said second ferromagnetic film;
said magnetic domain control layers contacting end faces of said first ferromagnetic film and said second ferromagnetic film;
portions of said pair of electrodes being stacked on said magnetoresistive effect film; and
a spacing of said electrodes being narrower than a width of said magnetoresistive effect film.

8. A magnetoresistive effect head comprising:
a magnetoresistive effect film having a plurality of stacked films;
magnetic domain control layers arranged at opposite ends of said magnetoresistive effect film in a track width direction of said magnetoresistive effect head; and
a pair of electrodes stacked on said magnetic domain control layers and electrically connected to said magnetoresistive effect film;
said magnetoresistive effect film including
a first ferromagnetic film of single-layer or multi-layer construction having a direction of magnetization thereof changed by a magnetic field from a magnetic recording medium,
a second ferromagnetic film of single-layer or multi-layer construction having a direction of magnetization thereof fixed,
a non-magnetic conductive film inserted between said first ferromagnetic film and said second ferromagnetic film, and
an antiferromagnetic film or permanent magnet film disposed at a position effective for fixing the direction of magnetization of said second ferromagnetic film;
said magnetic domain control layers contacting end faces of said first ferromagnetic film and said second ferromagnetic film;
said antiferromagnetic film or permanent magnet film being arranged adjacent to said electrodes;
portions of said pair of electrodes being stacked on said magnetoresistive effect film; and
a spacing of said electrodes being narrower than a width of said magnetoresistive effect film.

9. A magnetoresistive effect head comprising:
a magnetoresistive effect film having a plurality of stacked films;
magnetic domain control layers arranged at opposite ends of said magnetoresistive effect film in a track width direction of said magnetoresistive effect head; and
a pair of electrodes stacked on said magnetic domain control layers and electrically connected to said magnetoresistive effect film;
said magnetoresistive effect film including
a first ferromagnetic film of single-layer or multi-layer construction having a direction of magnetization thereof changed by a magnetic field from a magnetic recording medium,
second and third ferromagnetic films of single-layer or multi-layer construction having a direction of magnetization thereof fixed,
a first non-magnetic conductive film inserted between said first ferromagnetic film and said second ferromagnetic film, and
a second non-magnetic conductive film inserted between said first ferromagnetic film and said third ferromagnetic film;
said magnetic domain control layers contacting end faces of said first ferromagnetic film and said second ferromagnetic film;
said first ferromagnetic film being stacked on said second ferromagnetic film;
said third ferromagnetic film being stacked on said first ferromagnetic film; and
antiferromagnetic films or permanent magnet films disposed at positions effective for fixing the directions of magnetization of said second and third ferromagnetic films;
said first, second, and third ferromagnetic films being arranged between pairs of said antiferromagnetic films or permanent magnet films;
portions of said pair of electrodes being stacked on said antiferromagnetic film or permanent film for fixing the direction of magnetization of said third ferromagnetic film; and
a spacing of said electrodes being narrower than a width of said magnetoresistive effect film.

10. A magnetoresistive effect head comprising:
a magnetoresistive effect film having a plurality of stacked films;
magnetic domain control layers formed of permanent magnets arranged at opposite ends of said magnetoresistive effect film in a track width direction of said magnetoresistive effect head; and
a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said magnetoresistive effect film; and a spacing of said electrodes being narrower than a width of said magnetoresistive effect film.

11. A magnetoresistive effect head comprising:

a magnetoresistive effect film having a plurality of stacked films;

magnetic domain control layers formed of a stacked layer of an antiferromagnetic film and a soft magnetic film arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said magnetoresistive effect film; and a spacing of said electrodes being narrower than a width of said magnetoresistive effect film.

12. A magnetoresistive effect head comprising:

a magnetoresistive effect film having a plurality of stacked films;

magnetic domain control layers formed of permanent magnets arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said antiferromagnetic film; and a spacing of said electrodes being narrower than a width of said magnetoresistive effect film.

13. A magnetoresistive effect head comprising:

a magnetoresistive effect film having a plurality of stacked films;

magnetic domain control layers formed of a stacked layer of an antiferromagnetic film and a soft magnetic film arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium,
- a second ferromagnetic film of single-layer or multi-layer construction having a direction of magnetization thereof fixed,
- a non-magnetic conductive film inserted between said first ferromagnetic film and said second ferromagnetic film, and
- an antiferromagnetic film disposed at a position effective for fixing the direction of magnetization of said second ferromagnetic film;

said magnetic domain control layers contacting end faces of said first ferromagnetic film and said second ferromagnetic film;

portions of said pair of electrodes being stacked on said antiferromagnetic film or permanent magnet film; and a spacing of said electrodes being narrower than a width of said magnetoresistive effect film.

14. A magnetoresistive effect head comprising:

a magnetoresistive effect film having a plurality of stacked films;

magnetic domain control layers formed of permanent magnets arranged at opposite ends of said magnetoresistive effect film in a track width direction of said magnetoresistive effect head; and a pair of electrodes stacked on said magnetic domain control layers and electrically connected to said magnetoresistive effect film;

said magnetoresistive effect film including
- a first ferromagnetic film of single-layer or multi-layer construction having a direction of magnetization thereof changed by a magnetic field from a magnetic recording medium, second and third ferromagnetic films of single-layer or multi-layer construction having a direction of magnetization thereof fixed, a first non-magnetic conductive film inserted between said first ferromagnetic film and said second ferromagnetic film, and a second non-magnetic conductive film inserted between said first ferromagnetic film and said third ferromagnetic film;

said magnetic domain control layers contacting end faces of said first ferromagnetic film and said second ferromagnetic film;

said first ferromagnetic film being stacked on said second ferromagnetic film;

said third ferromagnetic film being stacked on said first ferromagnetic film; and antiferromagnetic films disposed at positions effective for fixing the directions of magnetization of said second and third ferromagnetic films;

said first, second, and third ferromagnetic films being arranged between pairs of said antiferromagnetic films;

portions of said pair of electrodes being stacked on said antiferromagnetic film for fixing the direction of magnetization of said third ferromagnetic film; and a spacing of said electrodes being narrower than a width of said magnetoresistive effect film.

15. A magnetoresistive effect head comprising:

a magnetoresistive effect film having a plurality of stacked films;

magnetic domain control layers formed of a stacked layer of an antiferromagnetic film and a soft magnetic film arranged at opposite ends of said magnetoresistive effect film in a track width direction of said magnetoresistive effect head; and a pair of electrodes stacked on said magnetic domain control layers and electrically connected to said magnetoresistive film;

said magnetoresistive effect film including a first ferromagnetic film of single-layer or multi-layer construction having a direction of magnetization thereof changed by a magnetic field from a magnetic recording medium, second and third ferromagnetic films of single-layer or multi-layer construction having a direction of magnetization thereof fixed, a first non-magnetic conductive film inserted between said first ferromagnetic film and said second ferromagnetic film, and a second non-magnetic conductive film inserted between said first ferromagnetic film and said third ferromagnetic film;

said magnetic domain control layers contacting end faces of said first ferromagnetic film and said second ferromagnetic film;

said first ferromagnetic film being stacked on said second ferromagnetic film;

said third ferromagnetic film being stacked on said first ferromagnetic film; and antiferromagnetic films or permanent magnet films disposed at positions effective for fixing the directions of magnetization of said second and third ferromagnetic films;

said first, second, and third ferromagnetic films being arranged between pairs of said antiferromagnetic films or permanent magnet films;

portions of said pair of electrodes being stacked on said antiferromagnetic film or permanent magnet film for fixing the direction of magnetization of said third ferromagnetic film; and a spacing of said electrodes being narrower than a width of said magnetoresistive effect film.

16. A magnetoresistive effect head according to any one of claims 1 to 15, wherein the width of said magnetoresistive effect film is equal to the spacing of said pair of electrodes plus 0.5 $\mu$m to 4 $\mu$m.

17. A magnetoresistive effect head according to any one of claims 1 to 15, wherein each of said pair of electrodes overlaps with said magnetoresistive effect film by 0.25 $\mu$m to 2 $\mu$m relative to the widthwise ends of said magnetoresistive effect film.

18. A magnetoresistive effect head according to any one of claims 1 to 15, wherein the spacing of said pair of electrodes is not larger than 2 $\mu$m.

19. A magnetic reproducing apparatus comprising:

a magnetic recording medium for magnetically recording information;

a reproducing head for transducing a change in a magnetic field leaked from said magnetic recording medium to an electrical signal; and a reproducing circuit for processing the electrical signal from said reproducing head;

wherein said reproducing head is a magnetoresistive effect head according to any one of claims 1 to 15.

20. A magnetic recording and reproducing apparatus comprising:

a magnetic recording medium for magnetically recording information;

a recording head for generating a magnetic field representing an electrical signal and recording information representing said magnetic field on said magnetic recording medium;

a reproducing head for transducing a change in a magnetic field leaked from said magnetic recording medium to an electrical signal; and a reproducing circuit for processing the electrical signal from said reproducing head;

wherein said reproducing head is a magnetoresistive effect head according to any one of claims 1 to 15.

* * * * *